(12) United States Patent
Ait-Haddou et al.

(10) Patent No.: US 9,649,603 B2
(45) Date of Patent: May 16, 2017

(54) HYDROPHILICALLY MODIFIED FLUORINATED MEMBRANE (III)

(71) Applicant: PALL CORPORATION, Port Washington, NY (US)

(72) Inventors: Hassan Ait-Haddou, Melville, NY (US); Khaled Abdel-Hakim Helmy Aamer, Port Washington, NY (US); Jian Qiu, Oakland Gardens, NY (US); Frank Okezie Onyemauwa, Pace, FL (US); Marcin Stasiak, Port Washington, NY (US)

(73) Assignee: Pall Corporation, Port Washington, NY (US)

( * ) Notice: Subject to any disclaimer, the term of this patent is extended or adjusted under 35 U.S.C. 154(b) by 265 days.

(21) Appl. No.: 14/675,562

(22) Filed: Mar. 31, 2015

(65) Prior Publication Data
US 2016/0288063 A1    Oct. 6, 2016

(51) Int. Cl.
*B01D 71/80* (2006.01)
*B01D 71/62* (2006.01)
(Continued)

(52) U.S. Cl.
CPC .......... *B01D 71/80* (2013.01); *B01D 61/027* (2013.01); *B01D 67/0088* (2013.01);
(Continued)

(58) Field of Classification Search
None
See application file for complete search history.

(56) References Cited

U.S. PATENT DOCUMENTS 4,136,237 A    1/1979  Takahashi et al.
4,975,507 A    12/1990 Asrar
(Continued)

FOREIGN PATENT DOCUMENTS

CN    102006925 A    4/2011
CN    102423642 A    4/2012
(Continued)

OTHER PUBLICATIONS

European Patent Office, Extended European Search Report in European Patent Application No. 15191763.0 (Sep. 5, 2016).
(Continued)

*Primary Examiner* — Krishnan S Menon
(74) *Attorney, Agent, or Firm* — Leydig, Voit & Mayer, Ltd.

(57) ABSTRACT

Disclosed are copolymers suitable for hydrophilically modifying the surface of fluoropolymer membranes. An example of the copolymers is:

Poly(M8-b-NPF6)

(Continued)

Also disclosed are a method of preparing the copolymers, a method of hydrophilically modifying porous fluoropolymer supports, hydrophilic porous fluoropolymer membranes prepared from the copolymers, and a method of filtering fluids by the use of the hydrophilic porous fluoropolymer membranes.

15 Claims, 4 Drawing Sheets

(51) Int. Cl.
- *B01D 71/32* (2006.01)
- *B01D 69/12* (2006.01)
- *B01D 67/00* (2006.01)
- *C08J 7/04* (2006.01)
- *B01D 61/02* (2006.01)
- *B01D 71/66* (2006.01)

(52) U.S. Cl.
CPC .......... *B01D 69/125* (2013.01); *B01D 71/32* (2013.01); *B01D 71/62* (2013.01); *B01D 71/66* (2013.01); *C08J 7/047* (2013.01); *B01D 2323/02* (2013.01); *B01D 2323/30* (2013.01); *B01D 2323/345* (2013.01); *B01D 2325/36* (2013.01); *B01D 2325/42* (2013.01); *C08J 2327/18* (2013.01); *C08J 2427/12* (2013.01)

(56) References Cited

U.S. PATENT DOCUMENTS

| | | | |
|---|---|---|---|
| 5,117,327 A | 5/1992 | Asrar et al. | |
| 5,200,470 A | 4/1993 | Asrar | |
| 5,219,662 A | 6/1993 | Grimminger et al. | |
| 5,294,493 A | 3/1994 | Beckerbauer et al. | |
| 5,418,277 A | 5/1995 | Ma et al. | |
| 6,080,826 A | 6/2000 | Grubbs et al. | |
| 6,126,825 A | 10/2000 | Shinagawa et al. | |
| 6,303,725 B1 | 10/2001 | Chang et al. | |
| 6,313,222 B1 | 11/2001 | Lin et al. | |
| 6,436,476 B1 | 8/2002 | Sage, Jr. | |
| 6,492,443 B1 | 12/2002 | Kodemura et al. | |
| 6,653,424 B1 | 11/2003 | Sakamoto et al. | |
| 6,677,418 B1 | 1/2004 | Feast et al. | |
| 6,987,154 B2 | 1/2006 | Choi et al. | |
| 7,232,917 B2 | 6/2007 | Sumida et al. | |
| 7,514,499 B2 | 4/2009 | Tam et al. | |
| 8,143,369 B2 | 3/2012 | Fujiwara et al. | |
| 8,223,472 B1 | 7/2012 | Dirk et al. | |
| 8,283,410 B2 | 10/2012 | Musa | |
| 8,410,290 B2 | 4/2013 | Fujiwara et al. | |
| 8,431,625 B2 | 4/2013 | Luchterhandt et al. | |
| 8,678,203 B2 | 3/2014 | Knapp et al. | |
| 8,883,925 B2 | 11/2014 | Kizu et al. | |
| 9,169,361 B1 | 10/2015 | Aamer | |
| 9,441,078 B2 * | 9/2016 | Aamer | C08G 81/00 |
| 2004/0067402 A1 | 4/2004 | Bahar et al. | |
| 2006/0205301 A1 | 9/2006 | Klare et al. | |
| 2007/0102349 A1 | 5/2007 | Duong et al. | |
| 2008/0234451 A1 | 9/2008 | Kenwright et al. | |
| 2009/0023877 A1 | 1/2009 | Liaw et al. | |
| 2009/0030175 A1 | 1/2009 | Yamamoto et al. | |
| 2009/0043059 A1 | 2/2009 | Liaw et al. | |
| 2009/0182117 A1 | 7/2009 | Takeyama et al. | |
| 2009/0264608 A1 | 10/2009 | Wakatsuki et al. | |
| 2009/0269601 A1 | 10/2009 | Ishiguro et al. | |
| 2009/0275719 A1 | 11/2009 | Ishiguro et al. | |
| 2011/0266220 A1 | 11/2011 | Campos et al. | |
| 2012/0041137 A1 | 2/2012 | Musa et al. | |
| 2012/0214940 A1 | 8/2012 | Hsu et al. | |
| 2012/0245271 A1 | 9/2012 | Pawlow et al. | |
| 2013/0108845 A1 | 5/2013 | Tee | |
| 2013/0281644 A1 | 10/2013 | Kiessling et al. | |
| 2013/0292872 A1 | 11/2013 | Knapp et al. | |
| 2014/0042090 A1 * | 2/2014 | Bell | B01D 67/0009 210/640 |
| 2014/0061122 A1 | 3/2014 | Ogura et al. | |
| 2014/0357820 A1 | 12/2014 | Stephen et al. | |

FOREIGN PATENT DOCUMENTS

| | | |
|---|---|---|
| CN | 103415335 A | 11/2013 |
| EP | 0 456 939 A1 | 11/1991 |
| EP | 0 526 823 A1 | 2/1993 |
| EP | 0 579 852 A1 | 1/1994 |
| EP | 0 922 486 A1 | 6/1999 |
| JP | 8-283447 A | 10/1996 |
| JP | 2010-59427 A | 3/2010 |
| JP | 2011-131208 A | 7/2011 |
| WO | WO 93/15255 | 8/1993 |
| WO | WO 00/43112 A1 | 7/2000 |
| WO | WO 2004/041397 A2 | 5/2004 |
| WO | WO 2009/097322 A1 | 8/2009 |
| WO | WO 2014/208592 A1 | 12/2014 |

OTHER PUBLICATIONS

Taiwanese Intellectual Property Office, Examination Report and Search Report in Taiwanese Patent Application No. 104135574 (Dec. 27, 2016).
Intellectual Property Office of Singapore, Search Report in Singapore Patent Application No. 10201508871Q (Feb. 9, 2016).
Japanese Patent Office, Notice of Reasons for Rejection in Japanese Patent Application No. 2015-209923 (Nov. 15, 2016).

* cited by examiner

HYDROPHILICALLY MODIFIED FLUORINATED MEMBRANE (III)

BACKGROUND OF THE INVENTION

The properties of fluoropolymer membranes, for example, porous PTFE membrane, including their mechanical strength, chemical resistance or inertness, non-adhesiveness, excellent dielectric property, thermal stability at high temperature and low coefficient of friction make it very attractive for various applications. However, for certain applications, it will be beneficial to modify the surface of PTFE without affecting its intrinsic properties. Efforts have been made to modify the surface and the chemical properties of PTFE membrane in order to improve the suitability of the membrane for specific applications. For example, efforts have included surface coating, blending, high energy surface modification, for example, broad band ultraviolet radiation or BBUV, where the membrane is exposed to a UV radiation of wavelength 250-450 nm, and plasma treatment, free radical, and ozone etching, atomic layer deposition, and synthesis of modified PTFE-like polymers. However, most of the efforts were focused on high energy treatment such as BBUV and plasma. Though the exact mechanism of these surface modification approaches is not reported, it likely results in the formation of free radicals by bond scission since C—C bond strength is known to be ~40% lower than F—F bond. If a majority of the radical results from C—C scission or main polymer chain scission, it could decrease the mechanical and the chemical stability of the PTFE membrane. It is also known that plasma treatment is limited to the surface of the membrane which makes it less stable during a long period of time.

The foregoing shows that there exists an unmet need for a surface modification of porous fluoropolymer membranes or supports to provide hydrophilic fluoropolymer porous membranes which are stable, and wherein the surface modification does not significantly affect the mechanical strength of the porous fluoropolymer supports or the resulting composite porous membranes.

BRIEF SUMMARY OF THE INVENTION

The invention provides a composite hydrophilic porous membrane comprising a porous fluoropolymer support and a coating comprising a copolymer, wherein the copolymer comprises repeat units A and B, wherein A is of the formula:

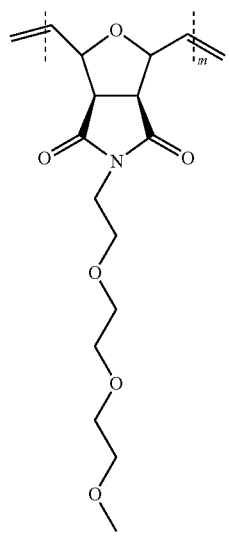

and B is of the formula

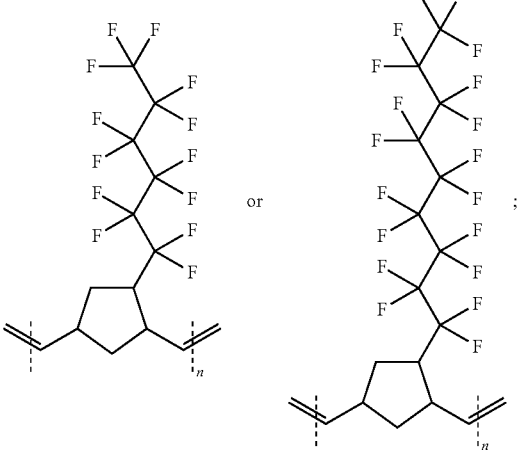

wherein:

the copolymer is a block copolymer or a random copolymer;

n and m, the number of repeat units A and B present in the copolymer, range from 1 to about 1000, provided the sum of n and m is equal to or greater than 10, wherein the copolymer is optionally crosslinked.

The invention also provides copolymers having ion-exchange or chelating functionalities.

The copolymers of the invention are useful in modifying the surface of porous fluoropolymer membranes or supports.

The present invention further provides methods of preparing the copolymers and methods of preparing hydrophilically modified fluoropolymer membranes.

BRIEF DESCRIPTION OF THE SEVERAL VIEWS OF THE DRAWING(S)

DETAILED DESCRIPTION OF THE INVENTION

Figure 1:
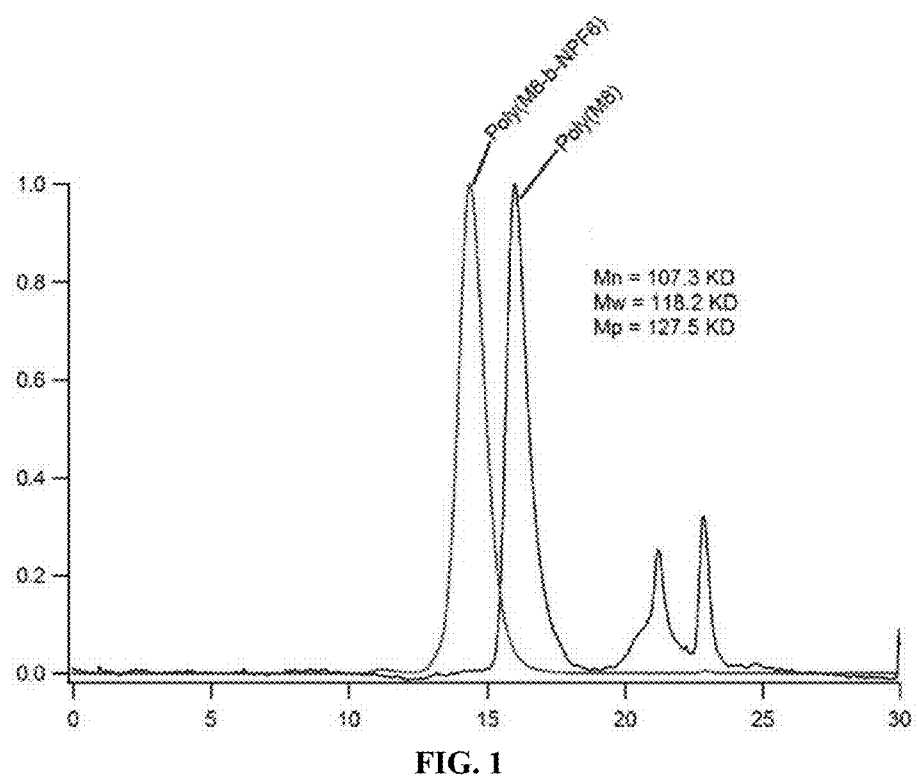
FIG. 1 illustrates a procedure for coating a porous fluoropolymer support with a hydrophilically modifying polymer in accordance with an embodiment of the invention.

In accordance with an embodiment, the invention provides a composite hydrophilic porous membrane comprising a porous fluoropolymer support and a coating comprising a copolymer, wherein the copolymer comprises repeat units A and B, wherein A is of the formula:

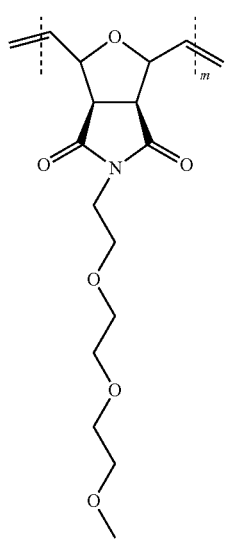

and B is of the formula

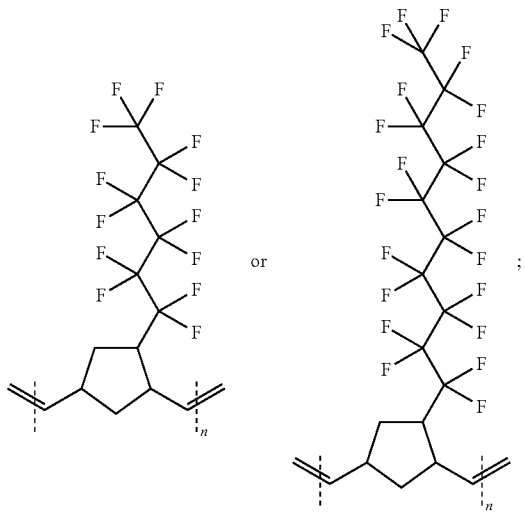 [SMILES: C=CC1CC(C=C)C(C(F)(F)C(F)(F)C(F)(F)C(F)(F)C(F)(F)C(F)(F)F)C1 ; C=CC1CC(C=C)C(C(F)(F)C(F)(F)C(F)(F)C(F)(F)C(F)(F)C(F)(F)C(F)(F)C(F)(F)C(F)(F)C(F)(F)F)C1]

wherein:

the copolymer is a block copolymer or a random copolymer;

n and m, the number of repeat units A and B present in the copolymer, range from 1 to about 1000, provided the sum of n and m is equal to or greater than 10, wherein the copolymer is optionally crosslinked.

In the formulas herein, dotted lines on the formulas of the repeat units indicate that the copolymer can be a block copolymer or a random copolymer. Block copolymer are indicated by parentheses: (repeat unit). Random copolymers are indicated by square brackets: [repeat unit].

In embodiments, n and m represent the degrees of polymerization of the respective monomers, and are independently from about 10 to about 1000, preferably from about 20 to about 50.

In other embodiments, n and m represent the mole fraction of the monomers present in the copolymer and n and m can independently range between 1 to 99 mole %, preferably 20 to 50 mole %.

The copolymer could be a block copolymer or a random copolymer. The block copolymer could be a diblock (A-B), triblock (A-B-A or B-A-B), or multiblock copolymer ((A-B)x). Optionally, the copolymer can have a third segment C, for example, a triblock copolymer or a random copolymer such as A-B-C.

The copolymer can be of any suitable molecular weight, for example, in an embodiment, a number or weight (Mn or Mw) average molecular weight from about 10 kDa to about 1000 kDa, preferably from about 75 kDa to about 500 kDa, and more preferably from about 250 kDa to about 500 kDa.

The respective monomer blocks can be present in the block copolymer in any suitable mass %, for example, in an embodiment, from about 99%: about 1% to about 50%: about 50%, preferably from about 90%: about 10% to about 70%: about 30%, and more preferably from about 75%: about 25%.

The copolymers can have any suitable chain ends, for example, chain ends selected from aryl groups and alkoxy groups, preferably phenyl and ethoxy groups.

In accordance with an embodiment, the copolymer of the invention is of the formula:

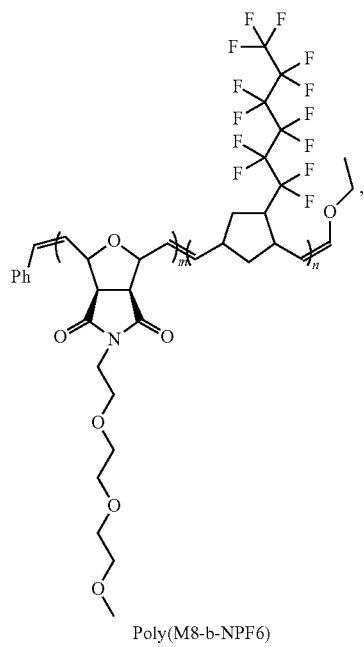

Poly(M8-b-NPF6)

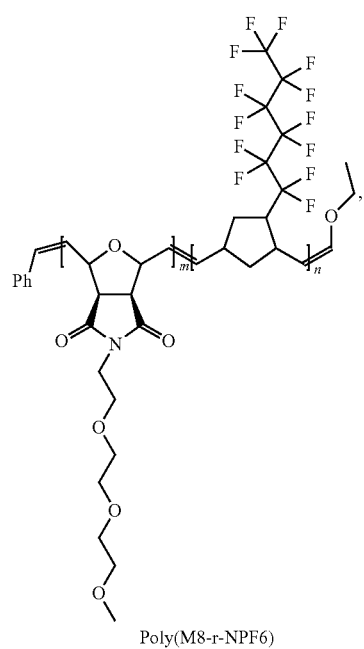

Poly(M8-r-NPF6)

-continued

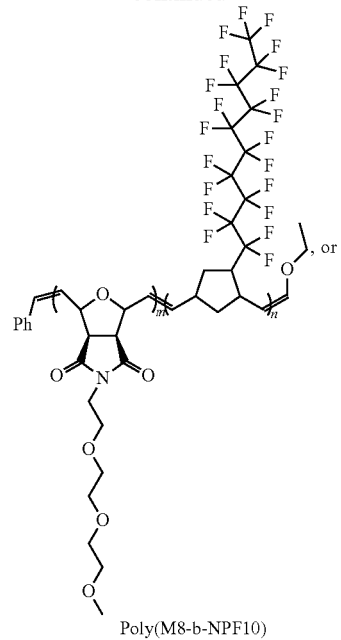

Poly(M8-b-NPF10)

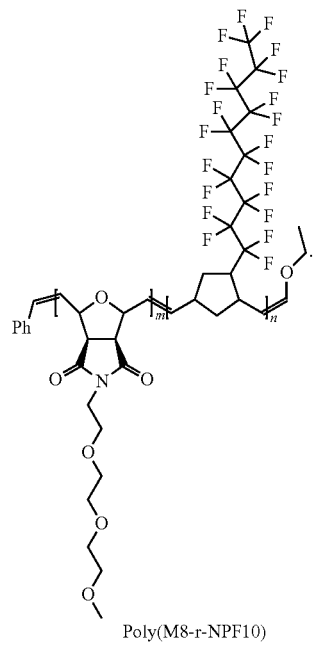

Poly(M8-r-NPF10)

In accordance with an embodiment, any of the above copolymer further comprises one or more repeat units C of the formula:

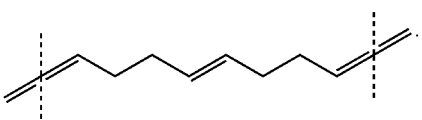

An example of a copolymer of the above embodiment is:

Poly(M8-b-NPF6-b-COD)

wherein k=1 to 1000.

Any of the embodiments of the copolymer can further comprise one or more chelating or ion-exchange functionalities attached to any of the repeat units, particularly to A and/or B.

Thus, the present invention provides a composite hydrophilic porous membrane comprising a porous fluoropolymer support and a coating comprising a copolymer, wherein the copolymer comprises repeat units A and B and one or more chelating or ion-exchange functionalities attached to one or more repeat units A and B, wherein A is of the formula:

and B is of the formula:

or wherein:

* is the point of attachment of the chelating or ion-exchange functionality;

the copolymer is a block copolymer or a random copolymer;

n and m, the number of repeat units A and B present in the copolymer, range from 1 to about 1000, provided the sum of n and m is equal to or greater than 10, wherein the copolymer is optionally crosslinked.

Examples of such copolymers include:

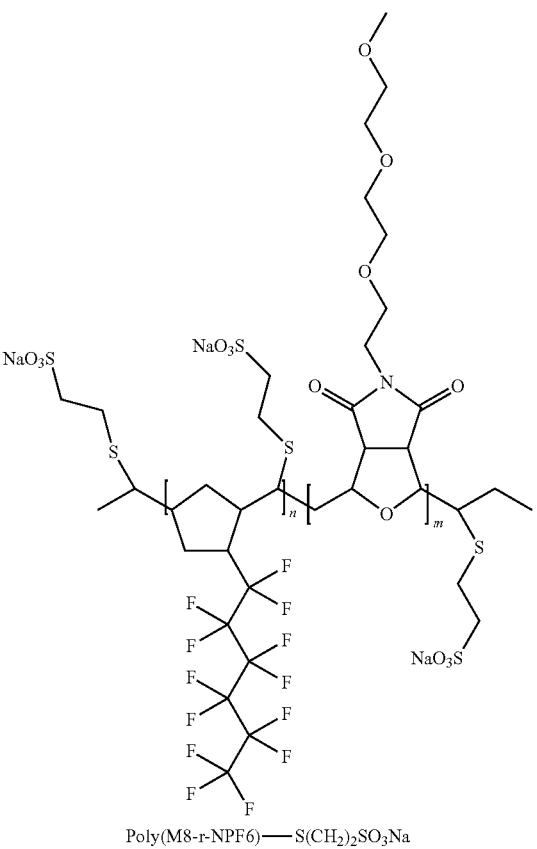

Poly(M8-r-NPF6)—S(CH$_2$)$_2$SO$_3$Na

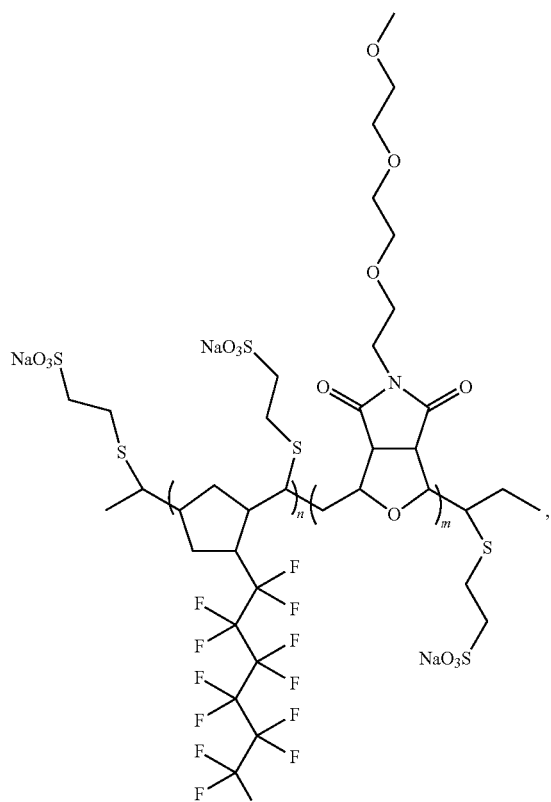

Poly(M8-b-NPF6)—S(CH$_2$)$_2$SO$_3$Na

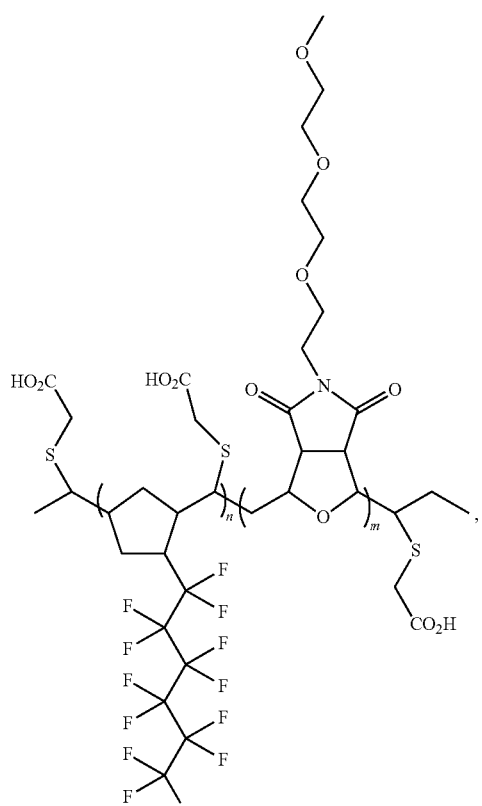

Poly(M8-b-NPF6)—S—CH$_2$COOH

11

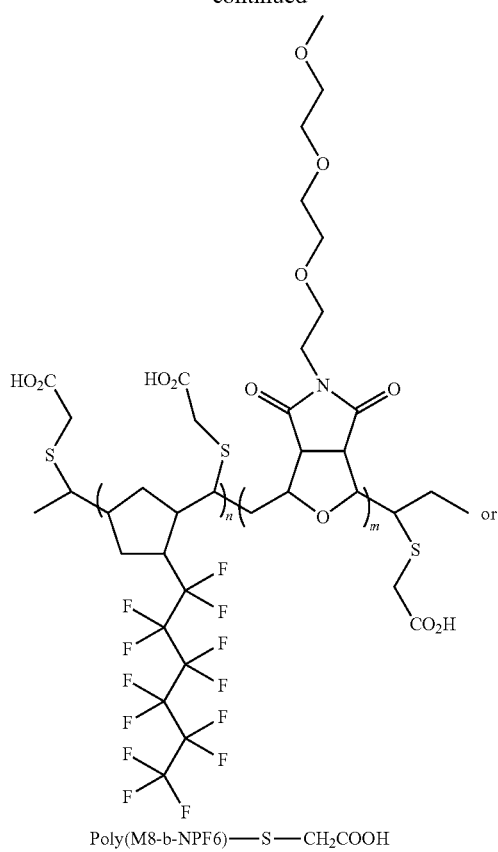

Poly(M8-b-NPF6)—S—CH₂COOH or

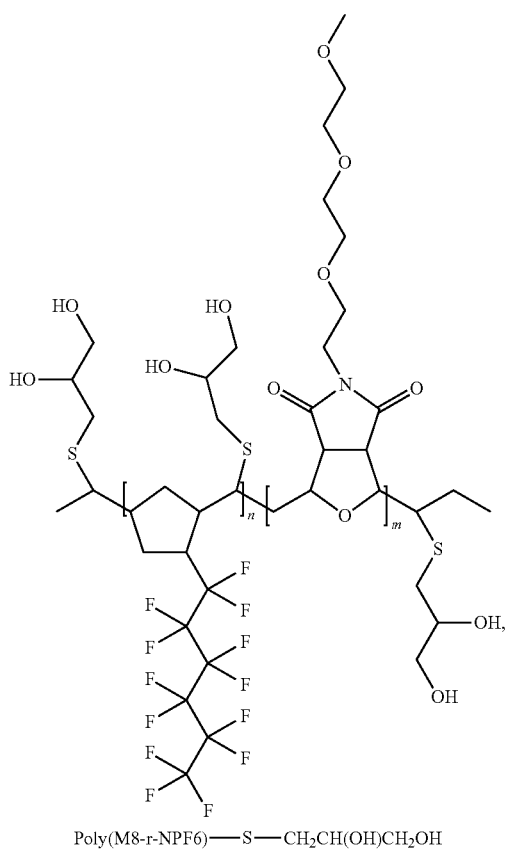

Poly(M8-r-NPF6)—S—CH₂CH(OH)CH₂OH

12

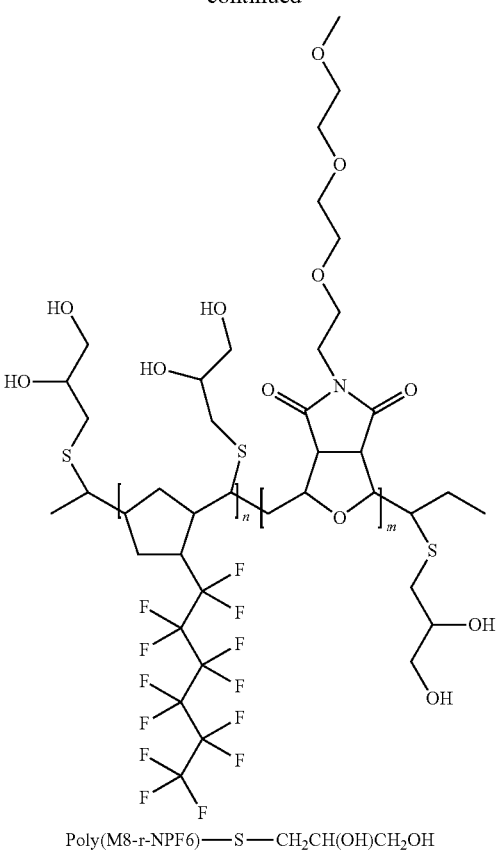

Poly(M8-r-NPF6)—S—CH₂CH(OH)CH₂OH

The copolymers of the invention can be prepared by any suitable method, for example, through ring opening metathesis polymerization (ROMP) of cyclic monomers. Typically a transition metal catalyst containing a carbene ligand mediates the metathesis reaction.

Any suitable ROMP catalyst can be used, for example, Grubbs' first, second, and third generation catalysts, Umicore, Hoveyda-Grubbs, Schrock, and Schrock-Hoveyda catalysts can be employed. Examples of such catalysts include the following:

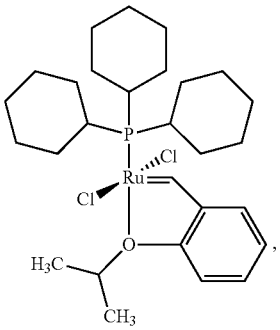

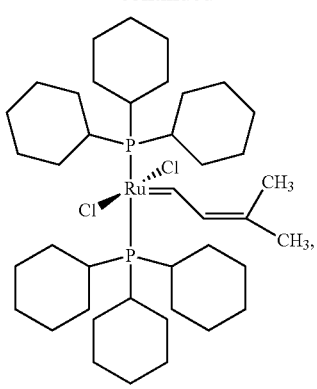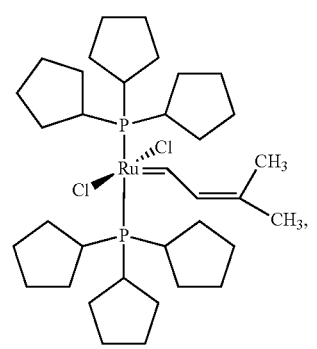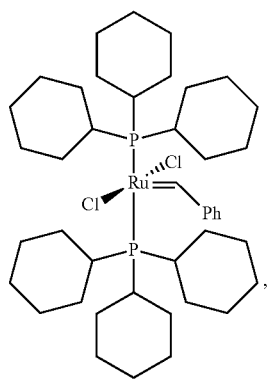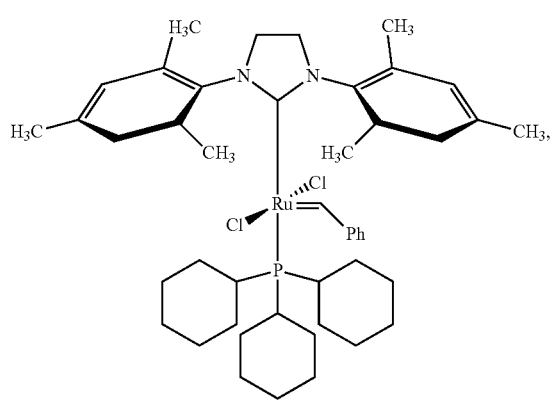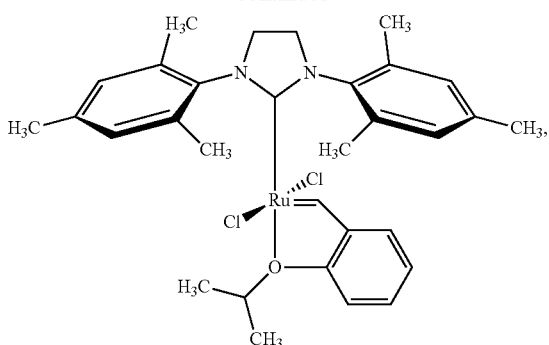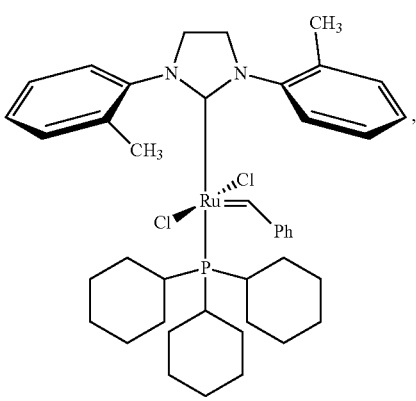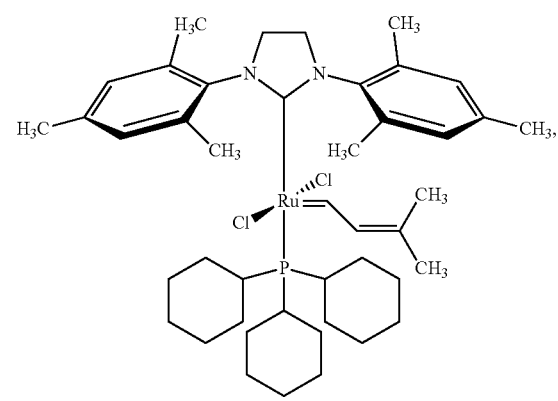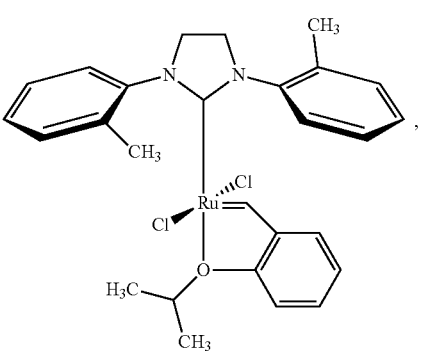

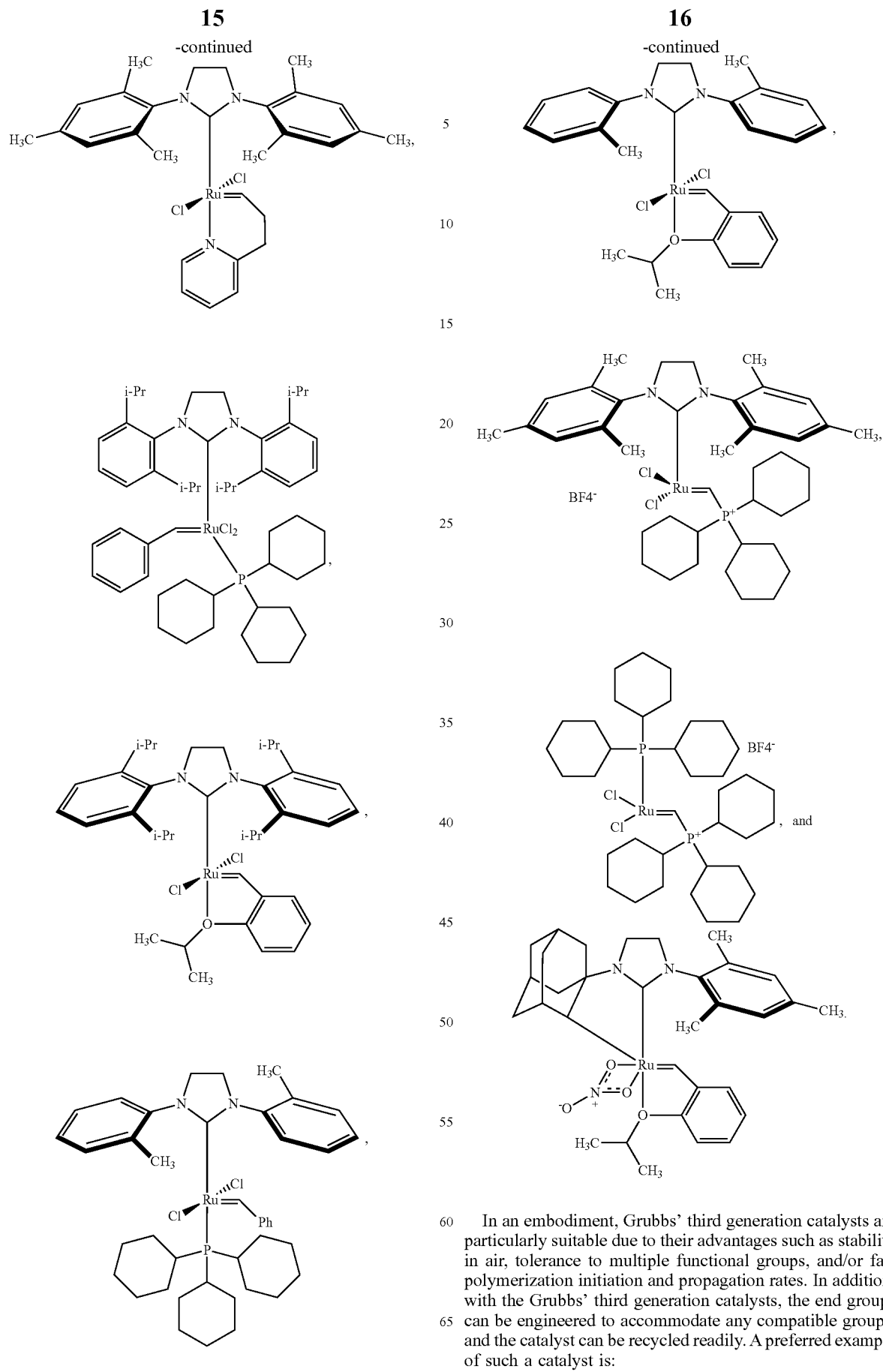

In an embodiment, Grubbs' third generation catalysts are particularly suitable due to their advantages such as stability in air, tolerance to multiple functional groups, and/or fast polymerization initiation and propagation rates. In addition, with the Grubbs' third generation catalysts, the end groups can be engineered to accommodate any compatible groups, and the catalyst can be recycled readily. A preferred example of such a catalyst is:

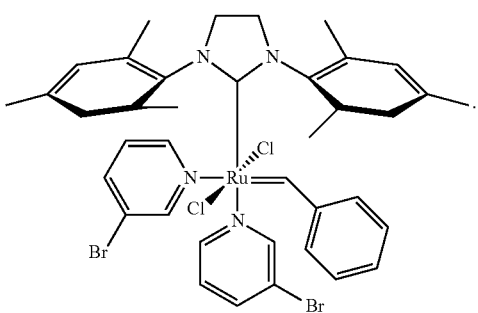

The above third generation Grubbs catalyst (G3) may be obtained commercially or prepared from a Grubbs second generation catalyst (G2) as follows:

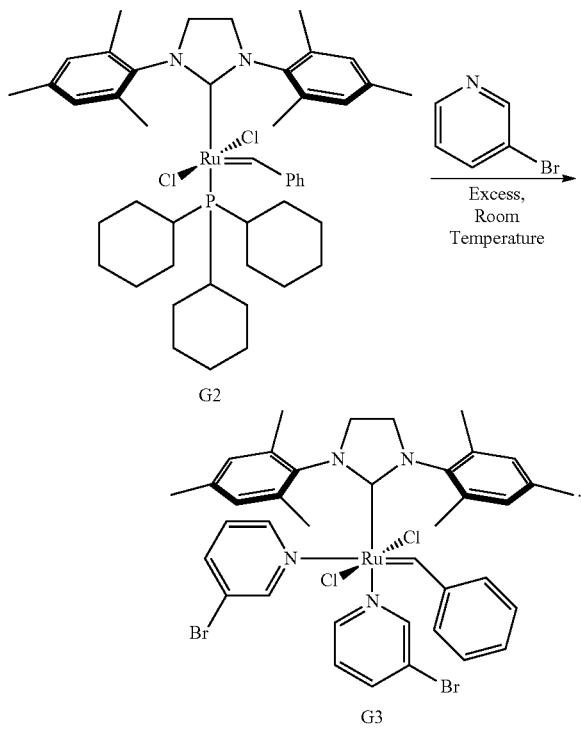

The polymerization of the monomers is conducted in a suitable solvent, for example, solvents generally used for conducting ROMP polymerizations. Examples of suitable solvents include aromatic hydrocarbons such as benzene, toluene, and xylene, aliphatic hydrocarbons such as n-pentane, hexane, and heptane, alicyclic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

The monomer concentration can be in the range of 1 to 50 wt %, preferably 2 to 45 wt %, and more preferably 3 to 40 wt %.

The polymerization can be carried out at any suitable temperature, for example, from −20 to +100° C., preferably 10 to 80° C.

The polymerization can be carried out for any time suitable to obtain the appropriate chain length of each of the blocks, which can be from about 1 minute to 100 hours.

The amount of catalyst can be chosen in any suitable amount. For example, the molar ratio of the catalyst to the monomer can be about 1:10 to about 1:1000, preferably about 1:50 to 1:500, and more preferably about 1:100 to about 1:200. For example, the molar ratio of the catalyst to the monomer could be 1:n and 1:m, where n and m are the average degrees of polymerization.

The copolymer can be isolated by a suitable technique, for example, precipitation with a nonsolvent.

The copolymers of the invention can be characterized for their molecular weights and molecular weight distributions by any known techniques. For example, a MALS-GPC technique can be employed. The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multi-angle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

The copolymers of the invention are highly monodisperse. For example, the copolymers have an Mw/Mn of 1.05 to 1.5, preferably 1.1 to 1.2.

In accordance with an embodiment, the invention provides a method of preparing a copolymer Poly(M8-b-NPF6) or Poly(M8-b-NPF10), comprising:

(i) polymerizing exo-7-oxanorbornene-N-4-monomethoxy triethylene glycol-5,6-dicarboxyanhydride (M8) catalyzed by a ring opening metathesis polymerization (ROMP) catalyst to obtain a homopolymer polyM8; and (ii) sequentially polymerizing on a chain end of the homopolymer obtained in (i) 5-(Perfluoro-n-hexyl) norbornene (NPF6) or 5-(Perfluoro-n-octyl) norbornene (NPF10), catalyzed by a ROMP catalyst.

The above method is illustrated below for Poly(M8-b-NPF6):

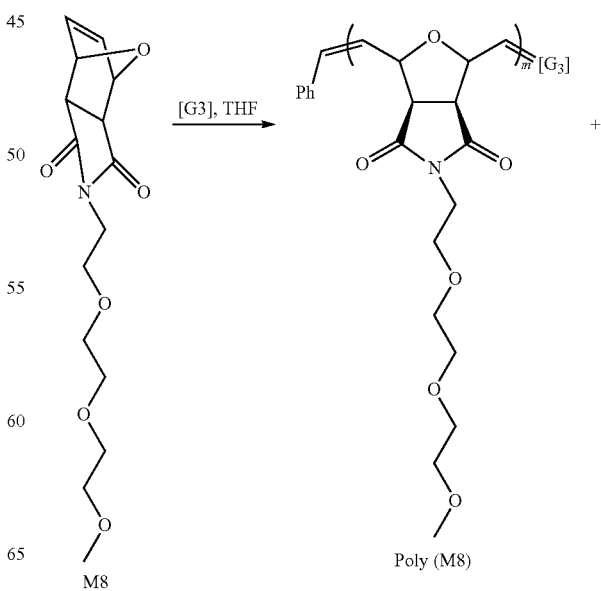

19
-continued
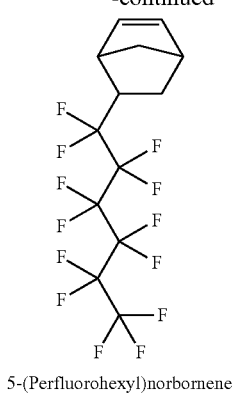
5-(Perfluorohexyl)norbornene
THF→
20
-continued
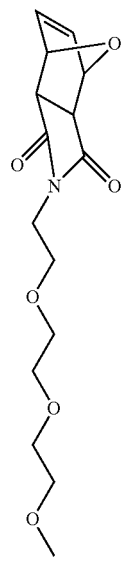
M8, Mw = 311.3
cis-5-oxaNorbornene-
exo-2,3-dicarboximide triethylene glycol
[G3]→
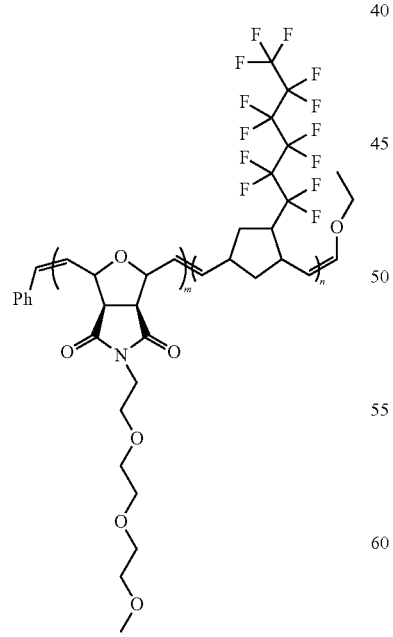
Poly (M8-b-NPF6)
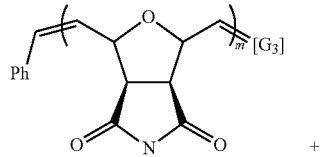
Poly (M8)
+

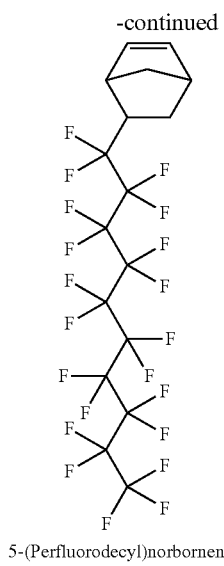
5-(Perfluorodecyl)norbornene
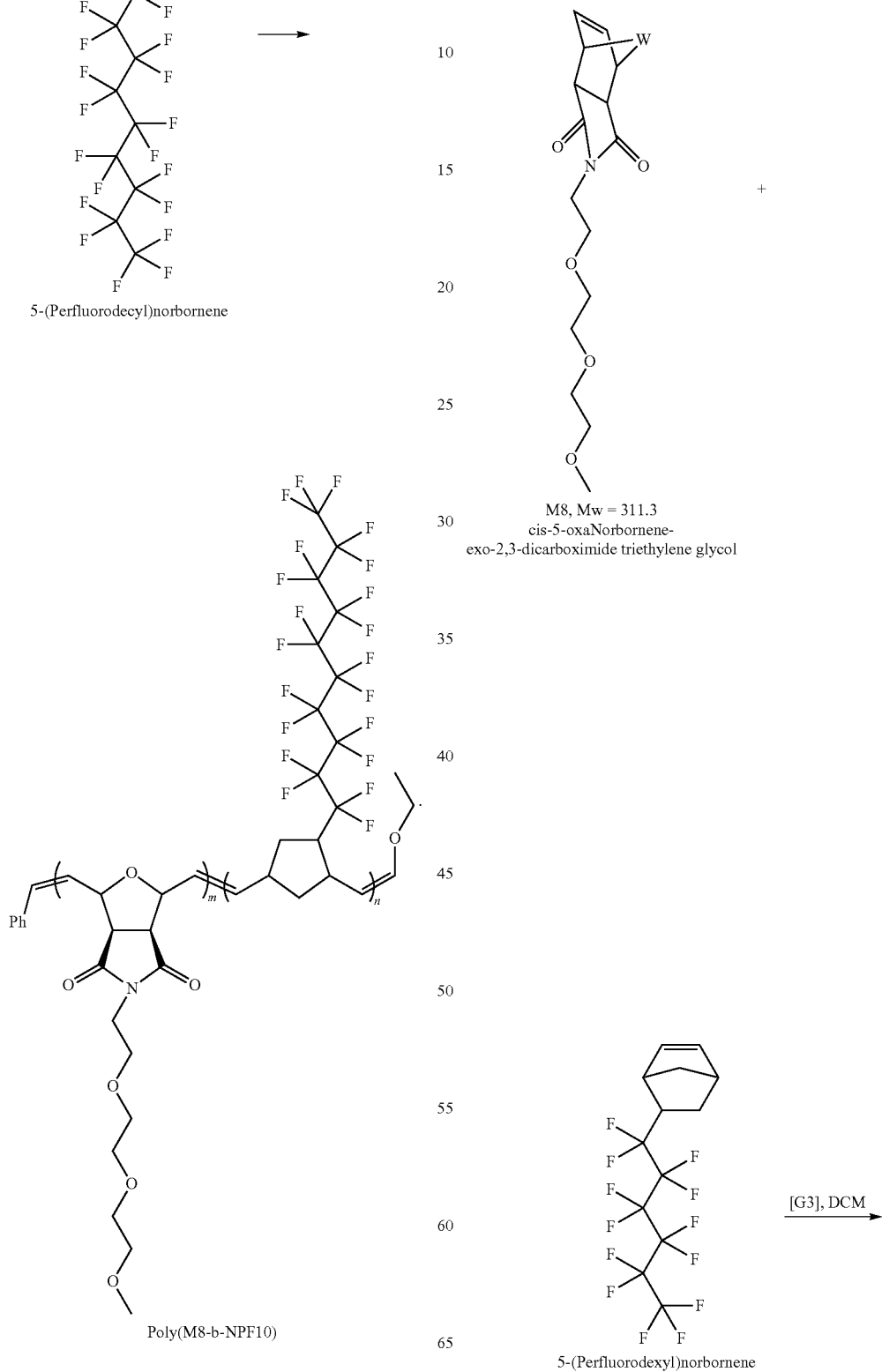
In accordance with an embodiment, the invention provides a method of preparing a random copolymer Poly(M8-r-NPF6) or Poly(M8-r-NPF10) comprising polymerizing a mixture of M8 and NPF6 or NPF10 by a ROMP catalyst.
The method is illustrated below for Poly(M8-r-NPF6):

-continued
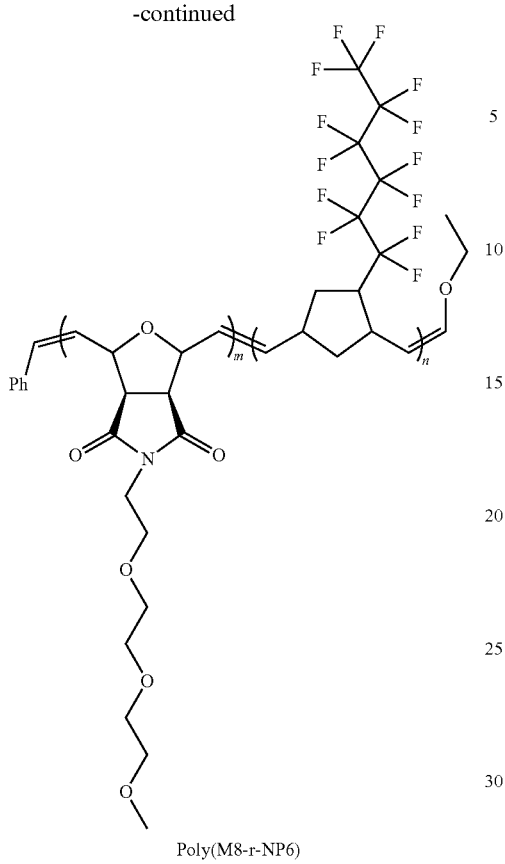
Poly(M8-r-NP6)
5-(Perfluorodecyl)norbornene (NPF10) can be prepared as follows:
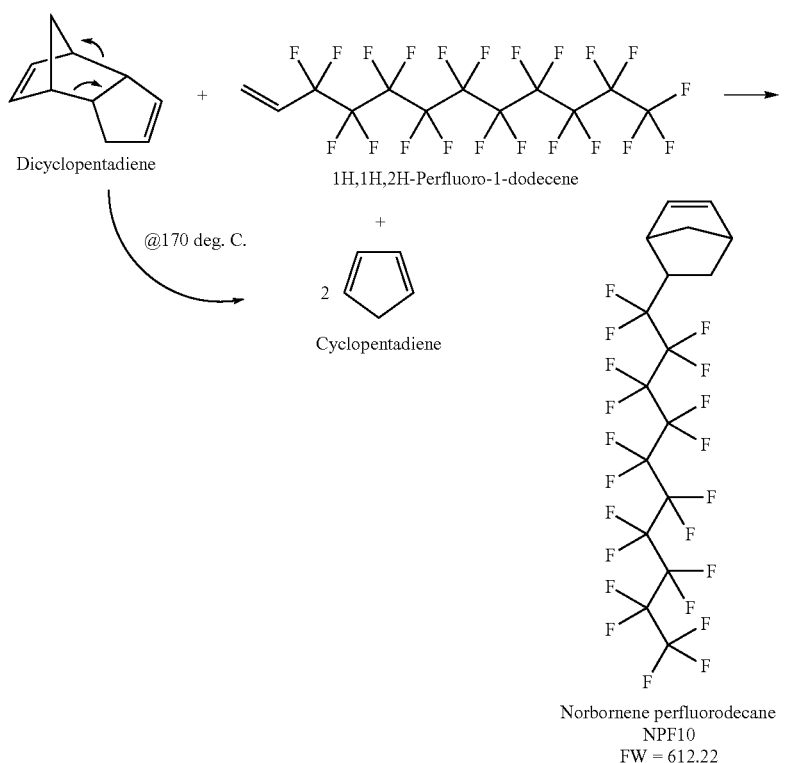

In accordance with an embodiment, the random copolymer Poly(M8-r-NPF10) can be prepared by a method comprising polymerizing a mixture of exo-7-oxanorbornene-N-4-monomethoxy triethylene glycol-5,6-dicarboxyanhydride (M8) and 5-(Perfluoro-n-octyl) norbornene catalyzed by a ROMP catalyst.

Poly(M8-b-NPF6) or Poly(M8-r-NPF6) can be further modified, e.g., by a thiolene reaction, as illustrated below:

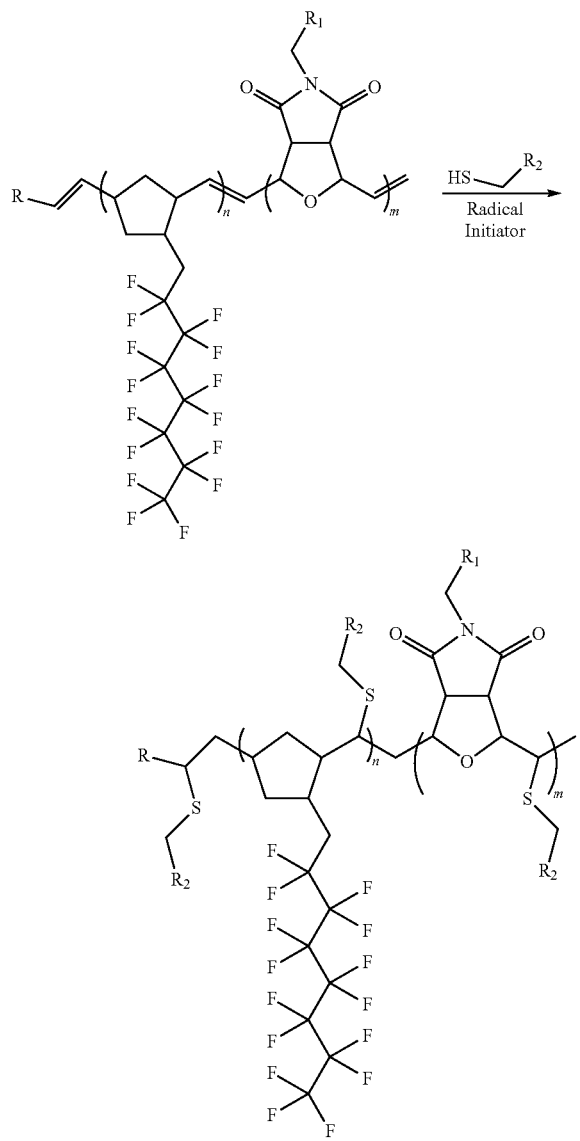

The present invention further provides a method of preparing a modified copolymer Poly(M8-b-NPF6)-S(CH$_2$)$_2$SO$_3$Na or Poly(M8-r-NPF6)-S(CH$_2$)$_2$SO$_3$Na, comprising reacting Poly(M8-b-NPF6) or Poly(M8-r-NPF6) with mercaptoethyl sodium sulfonate in the presence of a radical initiator, e.g., AIBN.

The present invention method of preparing a modified copolymer Poly(M8-b-NPF6)-SCH$_2$COOH or Poly(M8-r-NPF6)-SCH$_2$COOH, comprising reacting Poly(M8-b-NPF6) or Poly(M8-r-NPF6) with mercaptoacetic acid in the presence of a radical initiator, e.g., AIBN.

The present invention method of preparing a modified copolymer Poly(M8-b-NPF6)-SCH$_2$CH(OH)CH$_2$OH or Poly(M8-r-NPF6)-SCH$_2$CH(OH)CH$_2$OH, comprising reacting Poly(M8-b-NPF6) or Poly(M8-r-NPF6) with mercaptoglycerol in the presence of a radical initiator, e.g., AIBN.

Ammonium persulfate and other water soluble radical sources can be used.

Examples of other radical initiators such as peroxides, e.g., acetyl peroxide, benzoyl peroxides, dicumyl peroxide, and peresters such as t-butyl perbenzoate, can also be used in the above method.

The present invention further provides a composite hydrophilic membrane comprising a porous fluoropolymer support and a coating comprising a copolymer described above, wherein the copolymer is optionally crosslinked.

The present invention further provides a method of hydrophilically modifying a fluoropolymer support comprising:

(i) providing a porous fluoropolymer support;

(ii) coating the porous fluoropolymer support with a solution comprising a solvent and a copolymer as described above;

(iii) drying the coated porous fluoropolymer support from (ii) to remove at least some of the solvent from the solution comprising said copolymer; and optionally (iv) crosslinking said copolymer in the coated fluoropolymer support.

The surface tension of the resulting membrane can be determined as follows. For example, a sheet of PTFE membrane is coated at room temperature by pre-wetting the membrane sheet with IPA solvent and soaking the membrane in polymer solution with concentration that ranges between (0.1% to 10% by mass). The PTFE sheet coating time ranges between (1 min to 12 hours). After soaking the membrane, the membrane is dried in convection oven at 100° C.-160° C. The drying time ranges between (10 minutes to 12 h). The PTFE membrane wetting characteristics are measured by measuring the critical wetting surface tension.

The change in surface modification in terms of surface tension was measured by measuring the critical wetting surface tension (CWST). The method relies on a set of solutions of certain composition. Each solution has specific surface tension. The solutions surface tension ranges from 25 to 92 dyne/cm in small non-equivalent increments. To measure membrane surface tension, it is positioned on to top of white light table, one drop of a solution of certain surface tension is applied to the membrane surface and the time the drop takes to penetrate through the membrane and become bright white as an indication of light going through the membrane is recorded. Instant wetting is considered when the time the drop takes to penetrate the membrane is ≤10 seconds. If the time >10 seconds, the solution is considered to partially wet the membrane.

Crosslinking can be carried out by any suitable method, for example, by the use of a photoinitiator and a high energy radiation, e.g., UV. It is contemplated that the crosslinking would provide a highly stable polymer network in the membrane.

In an embodiment, the solution comprising the copolymer further comprises a crosslinking agent, e.g., a polymer of the formula C:

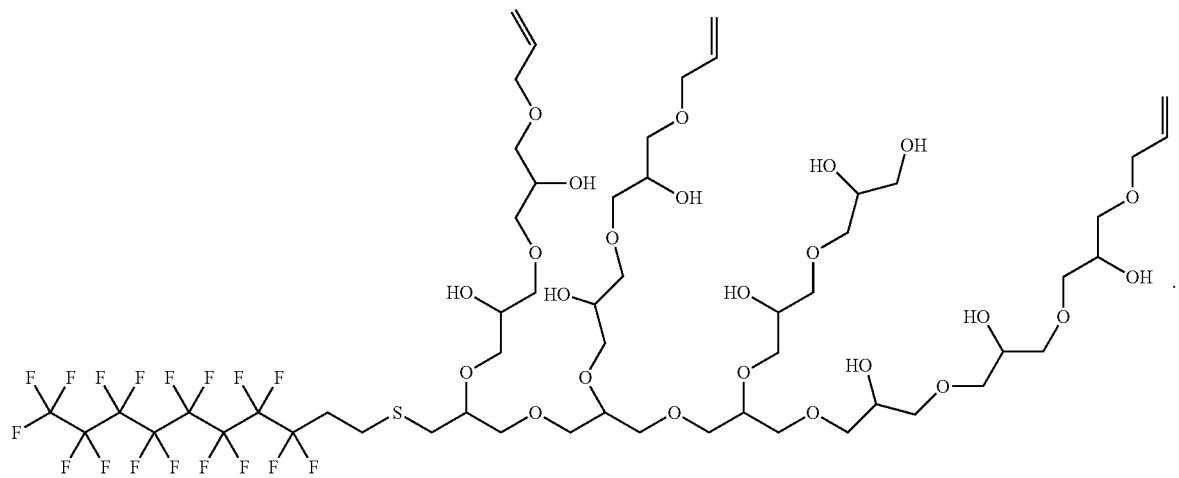

(C)

Polymer C can be prepared by stirring a mixture of perfluorodecanethiol, glycidol, and allylglycidyl ether in suitable amounts, at a temperature of about 80° C.-100° C. for a period of about 20 hours. Any excess glycidol and allyl glycidyl ether are removed by evaporation and the product dried at 40° C. in a vacuum oven overnight. For example, in an embodiment, perfluorodecanethiol (30 g) was mixed with glycidol (20 g), allyl glycidyl ether (50 g), and potassium carbonate (1.2 g). Reaction mixture was stirred at 80° C. for 20 hours. Excess glycidol and allyl glycidyl ether were evaporated and product dried at 40° C. in a vacuum oven overnight.

Crosslinking of the coating can be carried out as follows. The polymer coated PTFE sheets are optionally pre-wet with IPA, the sheets are then washed with the solvent with which the photo-initiator is prepared in to exchange IPA with that solvent. The sheets are then soaked in a solution of photo-initiator with certain concentration for a certain time followed by exposure to UV irradiation. The soaking time in photo-initiator solution ranges from 1 minute to 24 hours. The UV irradiation time ranges from 30 seconds to 24 hours. The membrane critical wetting surface tension (CWST), performance characterization, and/or SPM testing are then measured. "SPM" herein means hot sulfuric acid hydrogen peroxide mixture ($H_2SO_4$(96%): $H_2O_2$(30%) of 80:20 by volume) at 120 to 180° C.

In accordance with an embodiment of the invention, the hydrophilic fluoropolymer membrane is a porous membrane, e.g., a nanoporous membrane, for example, a membrane having pores of diameter between 1 nm and 100 nm, or a microporous membrane having pores of diameter between 1 μm and 10 μm.

The surface tension of the resulting porous membrane can be determined as follows. For example, a sheet of PTFE porous support is coated at room temperature by pre-wetting the membrane sheet with IPA solvent and soaking the membrane in a coating polymer solution with concentration that ranges between 0.1% and 10% by mass. The coating time ranges between (1 min to 12 hours). After soaking the support, it is dried in convection oven at 100° C. to 160° C. The drying time ranges between (10 minutes to 12 h). The resulting porous PTFE membrane's wetting characteristics are measured by measuring the critical wetting surface tension.

The change in surface modification in terms of surface tension was measured by measuring the critical wetting surface tension (CWST). The method relies on a set of solutions of certain composition. Each solution has specific surface tension. The solution's surface tension ranges from 25 to 92 dyne/cm in small non-equivalent increments. To measure the membrane surface tension, the membrane is positioned on to top of white light table, one drop of a solution of certain surface tension is applied to the membrane surface and the time the drop takes to penetrate through the membrane and become bright white as an indication of light going through the membrane is recorded. Instant wetting is considered when the time the drop takes to penetrate the membrane is ≤10 seconds. If the time >10 seconds, the solution is considered to partially wet the membrane.

Hydrophilic fluoropolymer porous membranes according to embodiments of the invention can be used in a variety of applications, including, for example, diagnostic applications (including, for example, sample preparation and/or diagnostic lateral flow devices), ink jet applications, lithography, e.g., as replacement for HD/UHMW PE based media, filtering fluids for the pharmaceutical industry, metal removal, production of ultrapure water, treatment of industrial and surface waters, filtering fluids for medical applications (including for home and/or for patient use, e.g., intravenous applications, also including, for example, filtering biological fluids such as blood (e.g., virus removal)), filtering fluids for the electronics industry (e.g., filtering photoresist fluids in the microelectronics industry and hot SPM), filtering fluids for the food and beverage industry, beer filtration, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In accordance with embodiments of the invention, the hydrophilic fluoropolymer membrane can have a variety of configurations, including planar, flat sheet, pleated, tubular, spiral, and hollow fiber.

Hydrophilic fluoropolymer porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

In accordance with an embodiment, the hydrophilic fluoropolymer membrane comprises any suitable porous fluoropolymer support, for example, a support made from PTFE, PVDF (polyvinylidene fluoride), PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane. The porous support can have any suitable pore size, e.g., from about 10 nm to about 10 microns, preferably PTFE and PVDF.

The present invention further provides a hydrophilically modified fluoropolymer membrane produced by the method described above.

The present invention further provides a method of filtering a fluid, the method comprising passing the fluid through the membrane described above.

The following examples further illustrate the invention but, of course, should not be construed as in any way limiting its scope.

EXAMPLE 1

Materials: The following materials were purchased and used as received.

Dimethyl 5-norbornene-2,3-dicarboxylate (C3) was purchased from Alfa Aesar,

Dichloromethane (DCM) was stored over activated Alumina and purged with Argon before use, Isopropyl alcohol (IPA), dicyclopentadiene (DCPD), 1H,1H,2H-Perflouro-1-octene (PF6), 1H,1H,2H-Perflouro-1-dodecene (PF10), toluene, thionyl chloride, ethylacetate, dimethylformamide (DMF), Maleimide, furan, diisopropylazodicarboxylate (DIAD), triphenylphosphine (Ph₃P), 1-haxadecanol, tetrahydrofuran (THF), ethyl acetate, N-phenylmaleimide, acetonitrile, methanol, Grubbs second generation catalyst, 3-bromopyridine, and pentane were obtained from Sigma-Aldrich Co. and used without further treatment. Dichloropentane, also obtained from Sigma-Aldrich Co., was treated with basic alumina before use. Cyclooctadiene (COD) was purified by vacuum distillation from boron trifluoride and used fresh.

EXAMPLE 2

This example illustrates the preparation of dichloro[1,3-bis(2,4,6-trimethylphenyl)-2-imidazolidinylidene](benzylidene)bis(3-bromopyridine)ruthenium(II) (G3) catalyst.

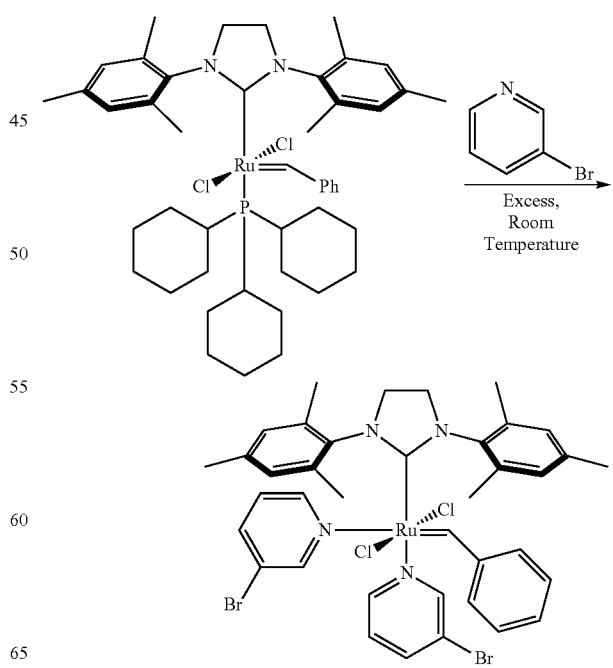

The second generation Grubbs catalyst (G2) illustrated above (1.0 g, 1.18 mmol) was mixed with 3-bromopyridine (1.14 mL, 11.8 mmol) in 50 mL flask. Upon stirring at room temperature for 5 min, the red mixture turned into bright green. Pentane (40 mL) was added with stirring for 15 minutes and green solid was obtained. The mixture was cooled in the freezer for 24 h and filtered under vacuum. The resulting G3 catalyst, a green solid, was washed with cold pentane and dried under vacuum at room temperature to give a yield of 0.9 g, 88% yield.

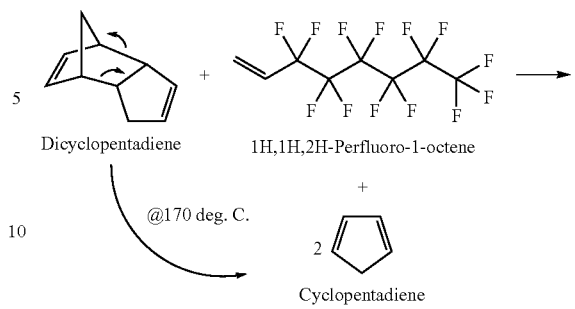

EXAMPLE 3

This example illustrates the gel permeation chromatographic characterization of the homopolymer and copolymers in accordance with an embodiment of the invention.

The homopolymer and block copolymer obtained was characterized for their molecular weight and molecular weight distribution properties by the MALS-GPC technique under the following conditions:

Mobile phase: Dichloromethane (DCM).

Mobile phase temperature: 30° C.

UV wavelength: 245 nm.

Columns used: three PSS SVD Lux analytical columns (styrene-divinylbenzene copolymer network), columns having as stationary phase beads of diameter 5 μm and pore sizes of 1000 A, 100,000 A, and 1,000,000 A, and guard columns.

Flow rate: 1 mL/min.

GPC system: waters HPLC alliance e2695 system with UV and RI detectors

MALS system: The DAWN HELEOS 8 system with 8 detectors operating a laser at 664.5 nm.

EXAMPLE 4

This example illustrates a procedure to prepare NPF6 monomer in accordance with an embodiment of the invention.

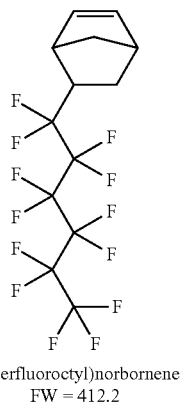

5-(Perfluorooctyl)norbornene
FW = 412.2

A Parr high pressure reactor cylinder vessel was charged with DCPD (100 ml, 737 mmol), PF6 (168 ml, 737 mmol) and the cylinder was attached to the reactor, and hydroquinone (2.43 g, 22.1 mmol), heated to 170° C. for 72 hours. The reaction content was dissolved into 150 ml DCM and transferred into 500 ml round bottom flask to purify the monomer by vacuum distillation.

$^{1}$H-NMR (CDCl$_3$): δ (ppm) 6.2-6.0 (2H), 3.2 (1H), 3.0 (1H), 2.8 (1H), 2.0 (1H), 1.5 (1H), and 1.2-1.4 (2H). $^{19}$F-NMR (CDCl$_3$): δ −89.9(s), −112.6 (m), −123.8 to −121.3 (m), −127.1 to −125.3 (m).

EXAMPLE 5

This example illustrates a procedure to prepare NPF10 monomer in accordance with an embodiment of the invention.

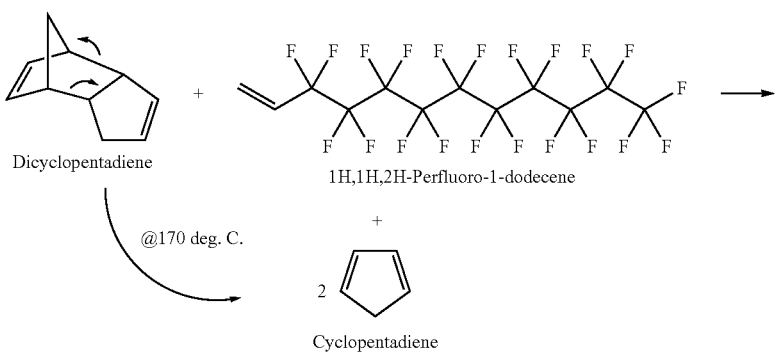

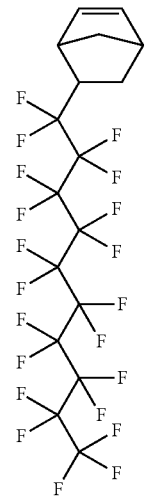

Norbornene perfluorodecane
NPF10
FW = 612.22

A Parr high pressure reactor cylinder vessel was charged with DCPD (24.6 ml, 183 mmol), PF6 (132 ml, 370 mmol) and the cylinder was attached to the reactor, and hydroquinone (1.08 g, 10 mmol), heated to 170° C. for 72 hours. The reaction content was dissolved into 150 ml DCM and transferred into 500 ml round bottom flask to purify the monomer by vacuum distillation.

$^1$H-NMR (CDCl$_3$): δ (ppm) 6.2-6.0 (2H), 3.2 (1H), 3.0 (1H), 2.8 (1H), 2.0 (1H), 1.5 (1H), and 1.2-1.4 (2H).
$^{19}$F-NMR (CDCl$_3$): δ −80.9(s), −112.6 (m), −123.8 to −121.4 (m), −127.2 to −125.5 (m).

EXAMPLE 6

This example demonstrates the synthesis and properties of Poly(M8-b-NPF6) in accordance with an embodiment of the invention.

The polymer was synthesized in two steps: 1—Synthesis of the homopolymer poly(M8) through ROMP technique using the third generation Grubs catalyst [G3] and M8 monomer in THF. The obtained living homopolymer was then reacted with 5-(Perfluorohexyl)norbornene (NPF6) monomer to yield the desired copolymer with the targeted mole ratio of PolyM8 and PolyNPF6 of (75:25). The prepared copolymer was characterized by proton NMR and elemental analysis to determine the mole ratio of the fluoroblock and GPC to determine the molecular weight of the copolymer.

The Grubbs 2$^{rd}$ generation (G2) catalyst (15.6 mg, 0.018 mmol) and triphenylphosphine (241 mg, 0.92 mmol) were weighed in 40 mL vial with equipped with fluoropolymer resin-silicone septa open-top cap. The catalyst was dissolved in argon-degassed dichloromethane (DCM) (40 mL) and transferred via cannula to a clean 1 L RBF equipped with stirring bar. A solution of the first monomer M8 (2.0 g, 6.42 mmol) in DCM (100 mL) was degassed with argon and transferred into the catalyst solution and shined for 30 minutes. An aliquot of 1-2 mL of the homopolymer formed from the first monomer was taken after 30 minutes for molecular weight characterization. A solution of the second monomer NPF6 (681 mg, 1.65 mmol) in DCM (200 mL) was degassed with argon and transferred into the growing homopolymer solution in the RBF, and the contents of the flask were stirred for another 180 minutes. Ethyl vinyl ether (2 mL) was then added to the yellow solution of the diblock copolymer to terminate the polymerization. The resulting polymer was precipitated in methanol (2 L, 2×) to recover the pure polymer as a white solid. The polymer was filtered and dried under vacuum at room temperature; yield (9.2 g, 98%).

$^1$H-NMR (300 MHz, CDCl$_3$): δ (ppm) 6.0 to 6.35 (s, broad), 5.5 to 6.0 (s, broad), 4.5 to 5.2 (s, broad), 4.3 to 4.5 (s, broad), 3.5 to 3.8 (m, broad), 3.0 to 3.3 (s, broad), 2.0 to 2.4 (s, broad), 1.5 to 1.7 (s, broad), 1.0 to 1.3 (s).

The GPC chromatogram of Poly(M8-b-NPF6) is depicted in FIG. 1 along with that of Poly(M8).

Figure 2:
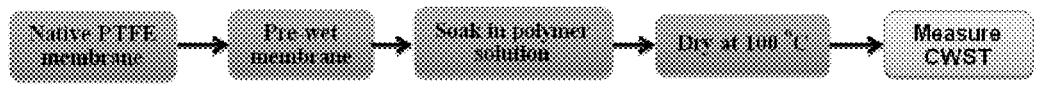
FIG. 2 illustrates a procedure for coating and crosslinking a porous fluoropolymer support with a hydrophilically modifying polymer in accordance with an embodiment of the invention.

The performance of the copolymer was assessed by coating of PTFE membrane using the following procedure, as illustrated in FIG. 2: (1) A solution of 1% by weight of the copolymer was prepared in THF; (2) a PTFE membrane was cleaned with acetone; and (3) the PTFE membrane was soaked in the 1% copolymer solution in THF for 30-60 minutes followed by extensive washing with THF. The coated membrane was dried at 100° C. in an oven for 10 minutes and then the CWST values were measured. The recorded CWSTs ranged from 33 to 35 dyne/cm. Unmodified PTFE had a CWST of 25.4 dyne/cm.

EXAMPLE 7

This example demonstrates a surface modifying property of Poly(M8-b-NPF6) in accordance with an embodiment of the invention.

Figure 3:
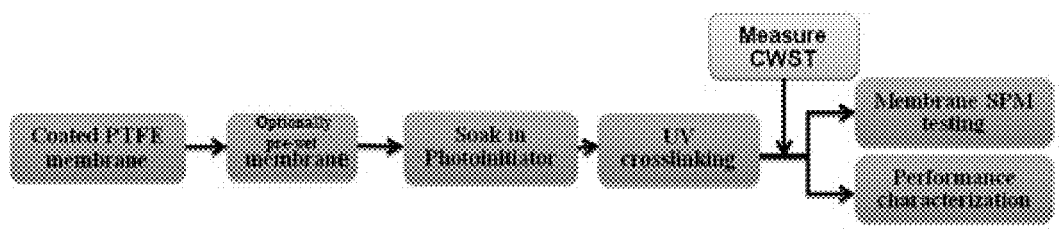
FIG. 3 depicts a GPC chromatogram of a polymer in accordance with an embodiment of the invention.

Coating Procedure for hot SPM Application: A 1% solution of Poly(M8-b-NPF6) in THF was used to coat PTFE 50 nm membrane using deep coating approach, as illustrated in FIG. 3. The membrane was washed/dried (CWST measured at this stage was 33-35 dyne/cm) and then soaked for 5 minutes in 0.5% solution of PI (Irgacure 2959) in water to allow the PI to adsorb onto the coated membrane. The membrane was dried and exposed to UV for 60 second and washed with THF to remove any remaining IP or loosely adsorbed copolymer. The membrane was dried and the CWST was measured and no change was observed. The cross-linked material was challenged with SPM (80% of $H_2SO_4$ at 98% and 20% of a $H_2O_2$ at 30% in water) at 140° C. for three hours under static conditions. The membrane was washed for 12 hour with DI water and dried. The CWST was 37-40 dyne/cm.

EXAMPLE 8

This example demonstrates the synthesis and properties of Poly(M8-r-NPF6) in accordance with an embodiment of the invention.

To a clean flame dried 250 ml RBF equipped with stirring bar, G3 catalyst (15 mg, 0.017 mmol) dissolved in Argon purged DCM (25 ml) was transferred via cannula, in a separate vial a solution of M8 monomer (3.0 g, 9.64 mmol) and NPF6 (1.33 g, 3.21 mmol) in DCM (125 ml) was added to the stirring G3 catalyst green solution to turn into light yellow green to light brown. Stirring was continued for a total of 15 h followed by the addition of excess of vinyl ethyl ether to terminate polymerization. The polymer solution was passed through a column of basic alumina, silica gel, and Celite to remove the catalyst. The solvent was removed in a rotary evaporator. The polymer obtained was colorless and highly viscous, which turned solid upon cooling. Yield (4.0 g, 92%).

$^1$H-NMR (300 MHz, CDCl3): δ (ppm) 5.0 to 6.4 (m, broad), 4.5 to 5.0 (m, broad), 4.0 to 4.5 (m, broad), 3.4 to 4.0 (m), 3.0 to 3.4 (s), 1.0 to 3.0 (m, broad).

Figure 4:
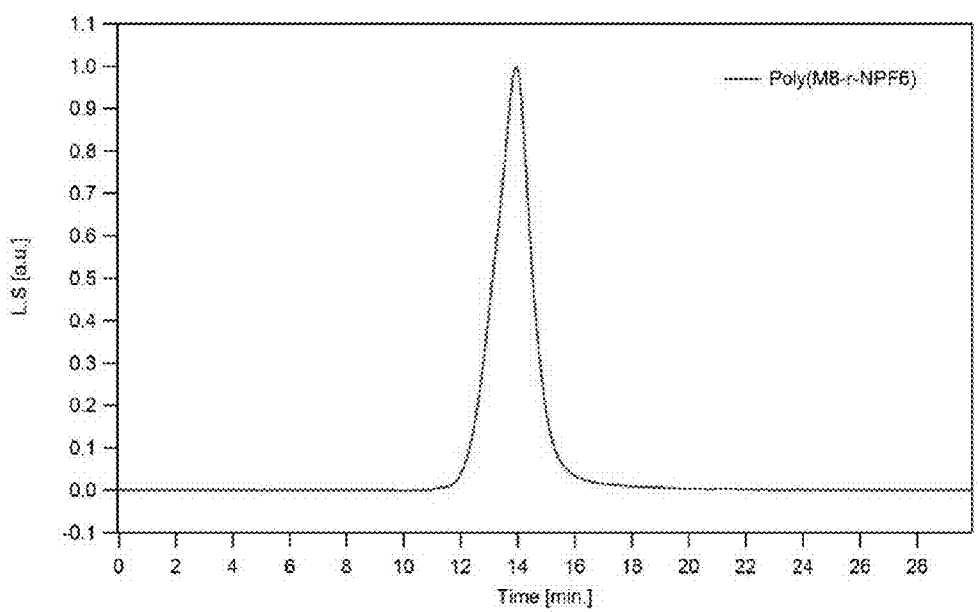
FIG. 4 depicts a GPC chromatogram of another polymer in accordance with an embodiment of the invention.

The GPC chromatogram of Poly(M8-r-NPF6) is depicted in FIG. 4.

Results of elemental analysis are set forth in Table 1.

TABLE 1

Elemental Analysis Data

| Material ID | Elemental Analysis | Actual (w %) | | | |
|---|---|---|---|---|---|
| | | C % | H % | N % | F % |
| Poly(M8-r-NPF6)-1 | C, H, N, F | 51.56 | 6.22 | 1.53 | 6.45 |
| Poly(M8-r-NPF6)-2 | C, H, N, F | 51.43 | 5.13 | 3.15 | 19.67 |

The ability of the copolymer to adsorb to fluorinated matrix was tested by coating the PTFE membrane with a 1% mass solution and testing the wettability of the coated membrane by measuring CWST for the membrane surface. If wetting took place under 10 seconds, it is described as instant wetting or simply wetting.

The CWST of PTFE increased from 25.4 dyne/cm to 39-40 dyne/cm upon treating the membrane and washing in the same coating solvent. The CWST values are set forth in Table 2.

TABLE 2

CWST Data of PTFE membranes

| Sample ID | Polymer Concentration for coating, mass % | CWST |
|---|---|---|
| Native PTFE | NA | 25.4 |
| Poly(M8-r-NPF6) -1 | 1 | 39 & 40 |

TABLE 2-continued

CWST Data of PTFE membranes

| Sample ID | Polymer Concentration for coating, mass % | CWST |
|---|---|---|
| Poly(M8-r-NPF6) -2 | 1 | 39 & 40 |
| Poly(M8-r-NPF6) -3 | 1 | 39 & 40 |
| Poly(M8-b-NPF6) | 1 | 33-35 |

EXAMPLE 9

This example demonstrates surface modifying properties of Poly(M8-r-NPF6) in accordance with an embodiment of the invention.

FIG. 3 depicts a process for coating the fluoropolymer membrane with the copolymer and crosslinking thereof with the use of a photoinitiator. Thus, a PTFE membrane was pre-coated with the copolymer by immersing for 1 hour in the copolymer solution. The membrane was air dried, followed by heat curing at 100° C. for 10 minutes. The CWST of the membrane was measured. The pre-coated membrane was pre-wetted with isopropanol, followed by rinsing with DI water. The membrane was soaked in a photoinitiator solution and air dried, followed by UV irradiation. The CWST of the membrane was measured. The membrane was heat cured at 100° C. for 10 minutes. The CWST of the membrane was measured.

The resulting membrane was challenged with SPM mixture. The membrane was pre-wet with isopropanol, followed by DI water rinse. The membrane was immersed for 3 hours in SPM, a mixture containing 96% $H_2SO_4$ and 30% $H_2O_2$ at a ratio of 80:20 (v/v). The membrane was then trickle washed with water for 12-24 hours and heat dried at 100° C. for 10 minutes. The CWST of the membrane was measured. Table 3 sets forth the CWST data.

TABLE 3

CWST Data

| Coating polymer + PI | PI concentration (%) | UV time (seconds) | CWST before SPM | CWST after SPM | Note |
|---|---|---|---|---|---|
| Poly(M8-r-NPF6) + Irgacure 2959 | 0.1 | 60' | 35 | 30 | |
| | | | 33 | 30 | |
| | 0.1 | 90' | 35 | 30 | |
| | | | 35 | 30 | |
| | 0.1 | 120 | 35 | 30 | 30 Partial after SPM |
| | | | 33 | 30 | |

EXAMPLE 10

This example demonstrates the synthesis and properties of Poly(M8-b-NPF6)-S(CH$_2$)$_2$SO$_3$Na (A), Poly(M8-b-NPF6)-SCH$_2$COOH (B), or Poly(M8-b-NPF6)-SCH$_2$CH(OH)CH$_2$OH (C) in accordance with an embodiment of the invention.

Thiolene reaction modifications of Poly(M8-b-NPF6) with MAcOH:

Poly(M8-b-NPF6) (0.99 g), thioglycolic acid (MAcOH, 0.9 g), and AIBN (79.8 mg) are dissolved in 33 ml of THF and allowed to react at 55° C. for 26 h under nitrogen. The reaction mixture was poured into water. The precipitate was re-dissolved in THF and precipitated again from heptane to yield a dark brown solid.

Thiolene reaction modifications of Poly(M8-b-NPF6) with MeSNa:

Poly(M8-b-NPF6) (0.99 g), sodium 2-mercaptoethanesulfonate (MeSNa, 1.6 g), and AIBN (79.8 mg) were dissolved in 33 ml of THF and allowed to react at 55° C. for 26 h under nitrogen. The reaction mixture was poured into water. The precipitate was re-dissolved in THF and precipitated again from heptane to yield a yellowish solid.

Thiolene reaction modifications of Poly(M8-b-NPF6) with thioglycerol:

Poly(M8-b-NPF6) (0.99 g), 1-thioglycerol (1.05 g), and AIBN (79.8 mg) were dissolved in 33 ml of THF and allowed to react at 55° C. for 26 h under nitrogen. The reaction mixture was poured into water. The precipitate was re-dissolved in THF and precipitated again from heptane to yield an off-white solid.

The ability of the copolymers to modify PTFE was tested as follows: A 1% solution of polymer A, B or C in a selected solvent was used to coat PTFE 50 nm membrane using the deep coating approach. The membrane was washed/dried (CWST measured at this stage was 36-52 dynes/cm) compared to the starting polymer that led to a CWST of 33-35 dynes/cm. The coated material was stable when exposed to sulfuric acid at room temperature. The coated membranes were stable at pH 1 and pH 12.

EXAMPLE 11

This example demonstrates the synthesis and properties of Poly(M8-b-NPF10) in accordance with an embodiment of the invention.

The Grubbs $2^{rd}$ generation (G2) catalyst (15.6 mg, 0.018 mmol) and triphenylphosphine (241 mg, 0.92 mmol) were weighed in 40 mL vial with equipped with fluoropolymer resin-silicone septa open-top cap. The catalyst was dissolved in argon-degassed dichloromethane (DCM) (20 mL) and transferred via cannula to a clean 1 L RBF equipped with stirring bar. A solution of the first monomer M8 (2.0 g, 6.42 mmol) in DCM (100 mL) was degassed with argon and transferred into the catalyst solution and stirred for 30 minutes. An aliquot of 1-2 mL of the homopolymer formed from the first monomer was taken after 30 minutes for molecular weight characterization. A solution of the second monomer NPF10 (1.01 g, 1.65 mmol) in DCM (200 mL) was degassed with argon and transferred into the growing homopolymer solution in the RBF, and the contents of the flask were stirred for another 180 minutes. Ethyl vinyl ether (2 mL) was then added to the yellow solution of the diblock copolymer to terminate the polymerization. The resulting polymer was precipitated in methanol (2 L, 2×) to recover the pure polymer as a white solid. The polymer was filtered and dried under vacuum at room temperature; yield (9.2 g, 98%).

$^1$H-NMR (300 MHz, CDCl$_3$): δ (ppm) 6.0 to 6.35 (s, broad), 5.5 to 6.0 (s, broad), 4.5 to 5.2 (s, broad), 4.3 to 4.5 (s, broad), 3.5 to 3.8 (m, broad), 3.0 to 3.3 (s, broad, 2.0 to 2.4 (s, broad), 1.5 to 1.7 (s, broad), 1.0 to 1.3 (s).

Figure 5:
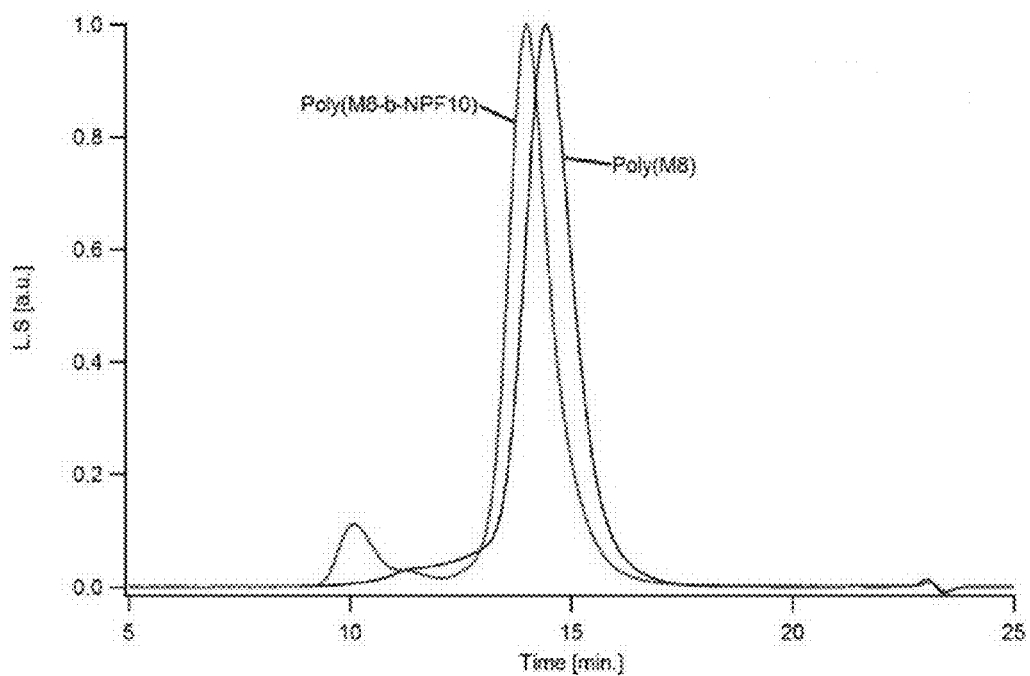
FIG. 5 depicts a GPC chromatogram of yet another polymer in accordance with an embodiment of the invention.

The GPC trace of Poly(M8-b-NPF10) is shown in FIG. 5 along with that of Poly (M8).

The ability of the copolymer to adsorb to fluorinated matrix was tested by coating the PTFE membrane with a 1% mass solution and testing the wettability of the coated membrane by measuring CWST for the membrane surface.

The CWST of PTFE increased from 25.4 dyne/cm to 33.41 dyne/cm upon treating the membrane and washing in the same coating solvent. The polymer had a feed mole ratio between the two blocks of [M8]:[NPF10]=90:10 mole % that offer strong adhesion the PTFE membrane. The CWST values are set forth in Table 4.

TABLE 4

| CWST Data | |
|---|---|
| Description | CWST 1 |
| Native PTFE | 25.4 |
| Poly-(M8-b-NPF10)-1 (<10% NPF10)- using 1% solution in THF | 35-37 |
| Poly-(M8-b-NPF6)-1 (20% NPF6)- using 1% solution in THF | 33-35 |

Table 4 illustrates a comparison between the contribution of NPF6 and NPF10 in the diblock copolymer to give higher CWST value at lower NPF10 content (10 for NPF10 vs 20% for NPF6).

EXAMPLE 12

This example demonstrates the synthesis and properties of Poly(M8-r-NPF10) in accordance with an embodiment of the invention.

To a clean flame-dried 250 ml RBF equipped with a stirring bar, G3 catalyst (15 mg, 0.017 mmol) dissolved in Argon purged DCM (25 ml) was transferred via cannula, in a separate vial a solution of M8 monomer (3.0 g, 9.64 mmol) and NPF10 (1.33 g, 2.17 mmol) in DCM (125 ml) was added to the stirring G3 catalyst green solution to turn into light yellow green to light brown. Stirring was continued for a total of 15 h followed by the addition of excess of vinyl ethyl ether to terminate polymerization. The polymer solution was passed through a column of basic alumina, silica gel, and Celite to remove the catalyst. The solvent was removed in a rotary evaporator. The polymer obtained was colorless and highly viscous turned solid upon cooling. Yield (4.0 g, 92%).

Figure 6:
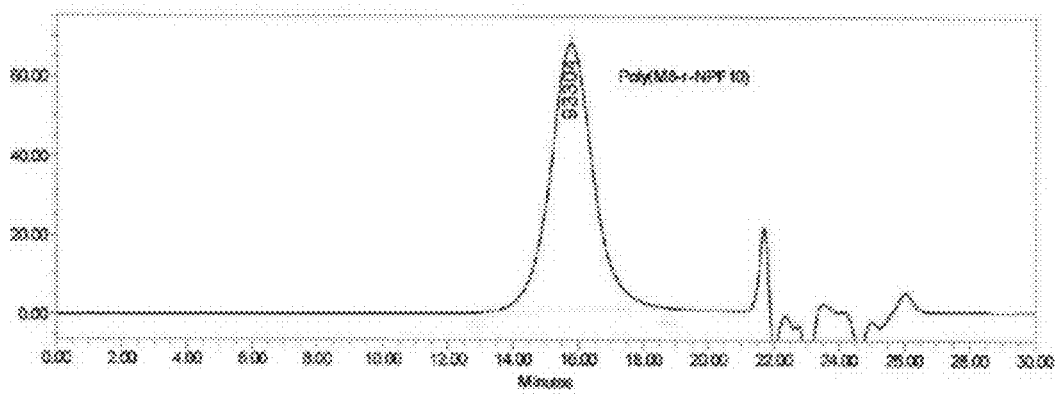
FIG. 6 depicts the GPC trace of Poly(M8-r-NPF10) copolymer in accordance with an embodiment of the invention.

The GPC trace is shown in FIG. 6. The ability of the copolymer to adsorb to fluorinated matrix was tested by coating the PTFE membrane with a 1% mass solution and testing the wettability of the coated membrane by measuring CWST for the membrane surface.

The PTFE CWST increased from 25.4 dyne/cm to 33.41 dyne/cm upon treating the membrane and washing in the same coating solvent. The polymer had a feed mole ratio between the two blocks of [M8]:[NPF10]=90:10 mole % that offered strong adhesion to the PTFE membrane. The CWST values are set forth in Table 5.

TABLE 5

| Description | CWST 1 |
| --- | --- |
| Native PTFE | 25.4 |
| Poly-(M8-b-NPF10)-1 -1% IN THF | 39-40 |

EXAMPLE 13

This example demonstrates a method for coating and crosslinking of Poly(M8-b-NPF6) in accordance with an embodiment of the invention.

Coating Procedure: 1% solution of Poly(M8-b-NPF6) in THF was used to coat PTFE 50 nm membrane via the deep coating approach. The membrane was washed/dried (CWST measured at this stage was 33-35 dynes/cm). The coated membrane was coated with a 0.5% solution of polymer C in water:methanol (1:1 v/v). The coated membrane was dried and heat stabilized at 100° C. for 10 minutes. The CWST increased to 73 dynes/cm. The membrane was cross-linked by the use of a 0.5% solution of PI (Irgacure 2959) in water to allow the PI to adsorb to the coated membrane. The membrane was dried and exposed to UV for 60 seconds and washed with THF and IPA to remove any remaining IP or loosely adsorbed copolymer C. The membrane was dried and the measured CWST was 55 dynes/cm compared to 73 dynes/cm achieved before the crosslinking. The crosslinked material was stable under sulfuric acid at room temperature. It was stable at pH 1 and at pH 14.

EXAMPLE 14

This example demonstrates the synthesis and properties of Poly(M8-b-NPF6-b-COD) in accordance with an embodiment of the invention.

The Grubbs $2^{rd}$ generation (G2) catalyst (14.5 mg, 0.017 mmol) and triphenylphosphine (224 mg, 0.86 mmol) were weighed in 40 mL vial with equipped with fluoropolymer resin-silicone septa open-top cap. The catalyst was dissolved in argon-degassed dichloromethane (DCM) (20 mL) and transferred via cannula to a clean 1 L RBF equipped with stirring bar. A solution of the first monomer M8 (2.0 g, 5.14 mmol) in DCM (100 mL) was degassed with argon and transferred into the catalyst solution and shirred for 30 minutes. An aliquot of 1-2 mL of the homopolymer formed from the first monomer was taken after 30 minutes for molecular weight characterization. A solution of the second monomer NPF6 (706 mg, 1.71 mmol) in DCM (100 mL) was degassed with argon and transferred into the growing homopolymer solution in the RBF, and the contents of the flask were stirred for another 180 minutes. A solution of the third monomer COD (1.86 g, 17.1 mmol) in DCM (20 mL) was degassed with argon and transferred into the growing diblock polymer solution in the RBF, and the contents of the flask were stirred for another 180 minutes. Ethyl vinyl ether (2 mL) was then added to the yellow solution of the diblock copolymer to terminate the polymerization. The resulting polymer was precipitated in methanol (2 L, 2×) to recover the pure polymer as a white solid. The polymer was filtered and dried under vacuum at room temperature.

$^1$H-NMR (300 MHz, CDCl3): δ (ppm) 6.5 to 6.0 (s, broad), 5.75 to 5.6 (m, broad), 5.5 to 5.2 (m, broad), 4.0 to 3.3 (m, broad), 3.3 to 3.2 (s, broad), 2.3 to 1.75 (m, broad).

Figure 7:
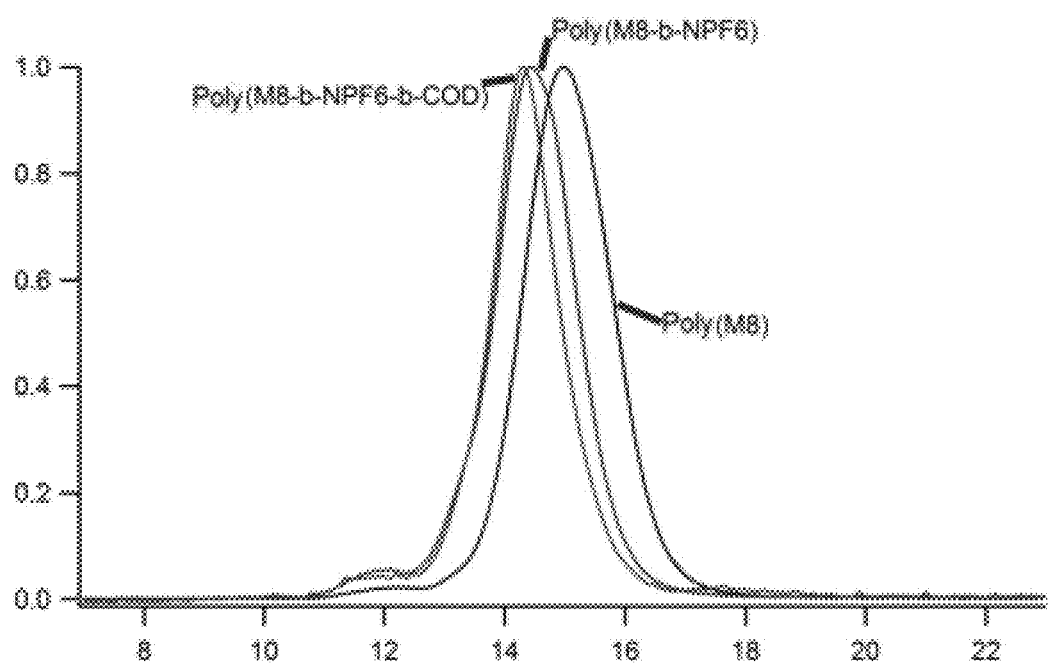
FIG. 7 depicts the GPC traces of Poly(M8), Poly(M8-b-NPF6), and Poly(M8-b-NPF10-b-COD) in accordance with an embodiment of the invention.

The GPC traces are set forth in FIG. 7.

A comparison of the wetting properties of Poly(M8-b-NFF6-b-COD) and Poly(NTEF-b-NPF10) is set forth in Table 6.

TABLE 6

| CWST data | |
| --- | --- |
| Polymer | CWST "Coating membrane @ 1% polymer concentration for 1 h" |
| Poly(M8-b-NPF6-b-COD) | 44 instant, 47 partial |
| Poly(NTEG-b-NPF10) | 33 instant, 35 partial |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A composite hydrophilic porous membrane comprising a porous fluoropolymer support and a coating comprising a copolymer, wherein the copolymer comprises repeat units A and B, wherein A is of the formula:

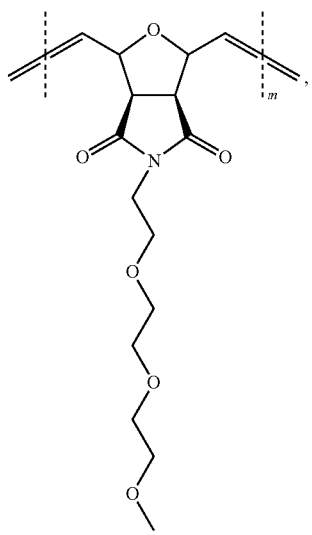

and B is of the formula

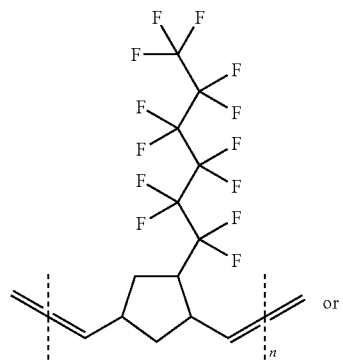 or

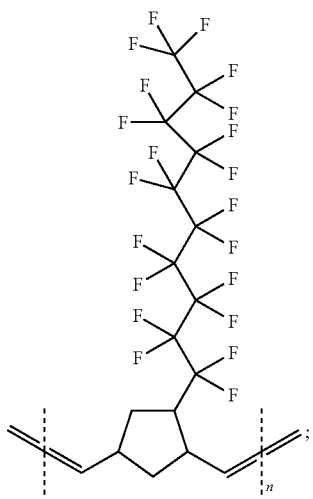

wherein:
the copolymer is a block copolymer or a random copolymer;
m and n, the number of repeat units A and B present in the copolymer, range from 1 to about 1000, provided the sum of n and m is equal to or greater than 10;
wherein the copolymer is optionally crosslinked.

2. The composite hydrophilic porous membrane of claim 1, wherein the copolymer has chain end groups selected from aryl groups and alkoxy groups.

3. The composite hydrophilic porous membrane of claim 1, wherein the copolymer is of one of the following formulae:

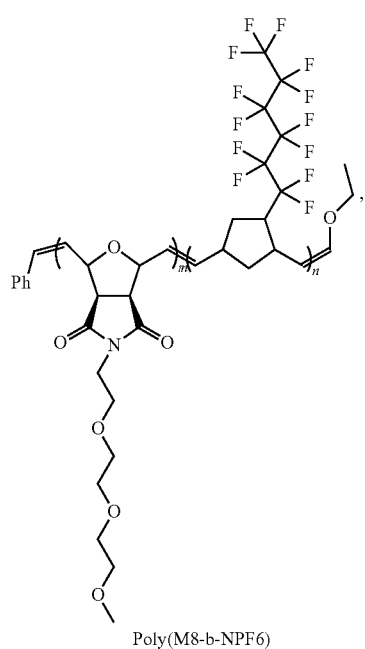
Poly(M8-b-NPF6)
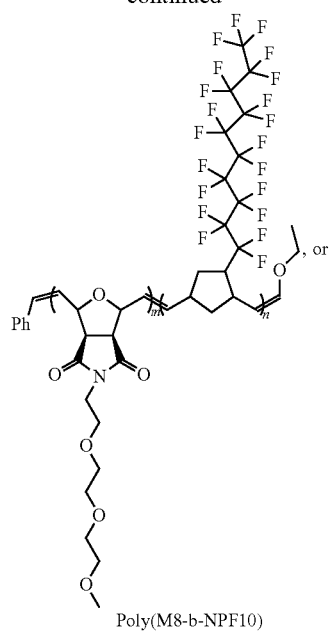
Poly(M8-b-NPF10)
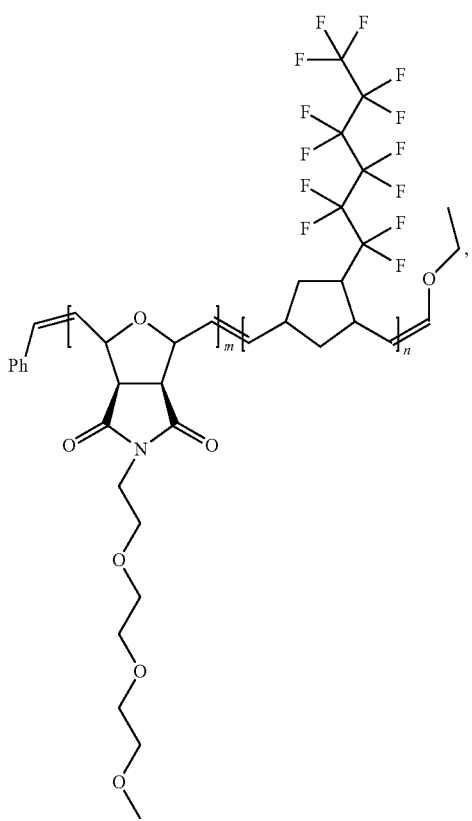
Poly(M8-r-NPF6)
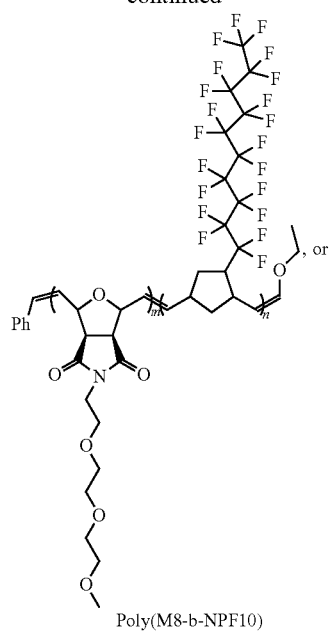
Poly(M8-r-NPF10)
4. The composite hydrophilic porous membrane of claim 1, wherein the copolymer further comprises one or more repeat units C of the formula:
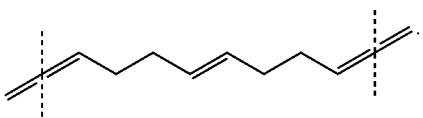
5. The composite hydrophilic porous membrane of claim 4, wherein the copolymer is:

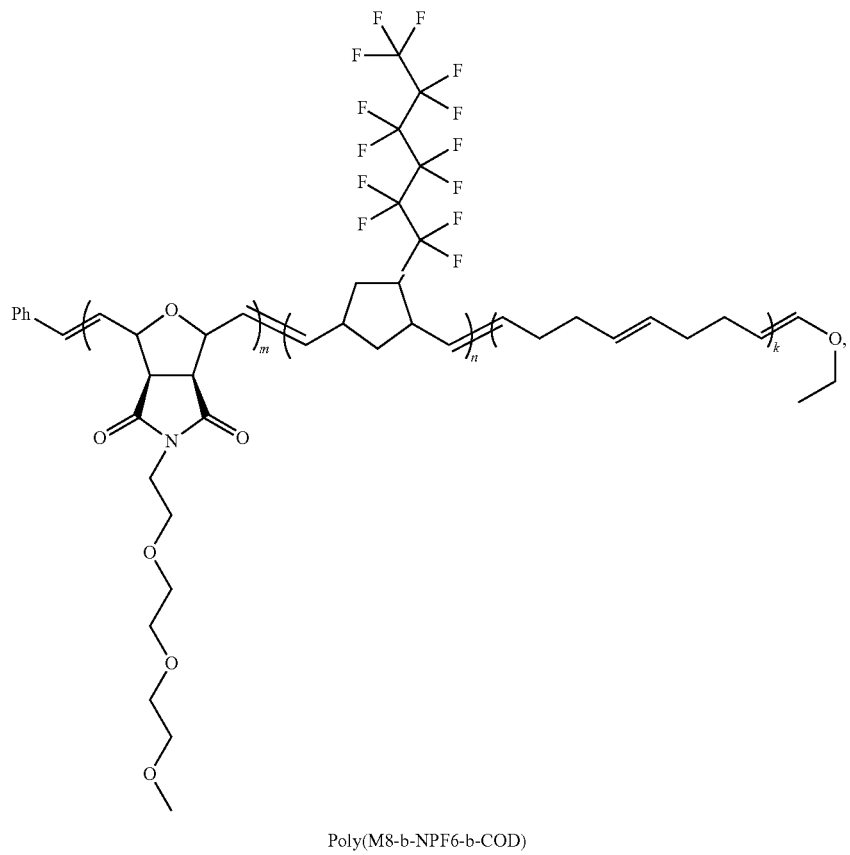
Poly(M8-b-NPF6-b-COD)
wherein k=1 to 1000.
6. A composite hydrophilic porous membrane comprising a porous fluoropolymer support and a coating comprising a copolymer, wherein the copolymer comprises repeat units A and B and one or more chelating or ion-exchange functionalities attached to one or more repeat units A and B, wherein A is of the formula:
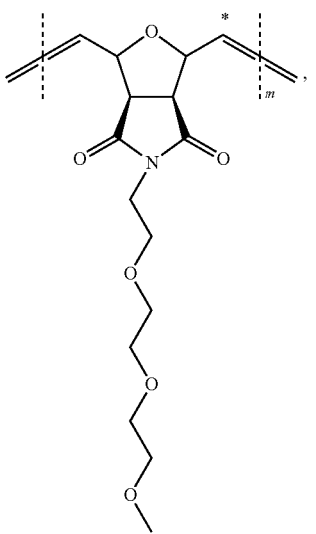
and B is of the formula:
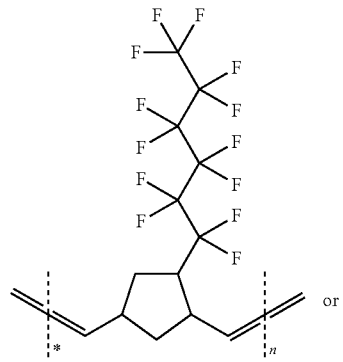
or -continued

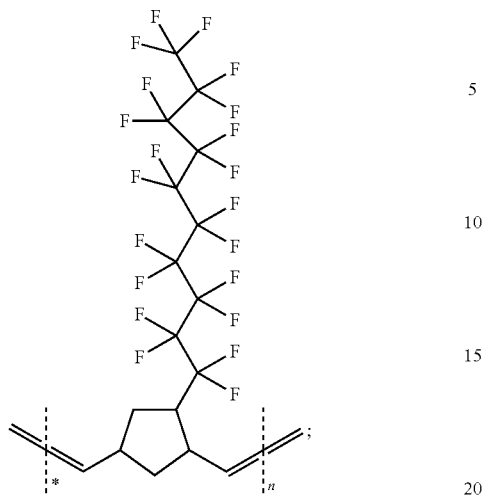

wherein:

* is the point of attachment of the chelating or ion-exchange functionality;

the copolymer is a block copolymer or a random copolymer;

m and n, the number of repeat units A and B present in the copolymer, range from 1 to about 1000, provided the sum of n and m is equal to or greater than 10;

wherein the copolymer is optionally crosslinked.

7. The composite hydrophilic porous membrane of claim 6, wherein the copolymer is:

-continued

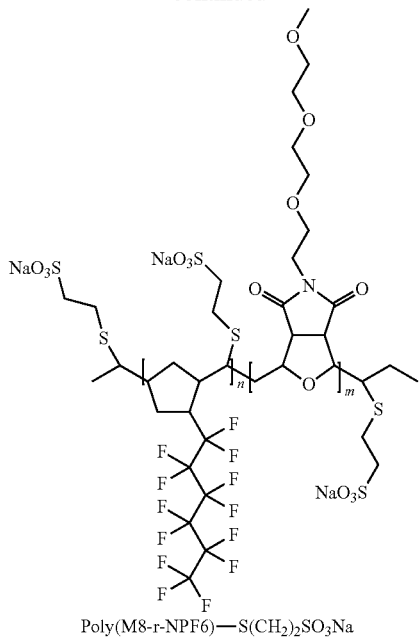

Poly(M8-r-NPF6)—S(CH₂)₂SO₃Na

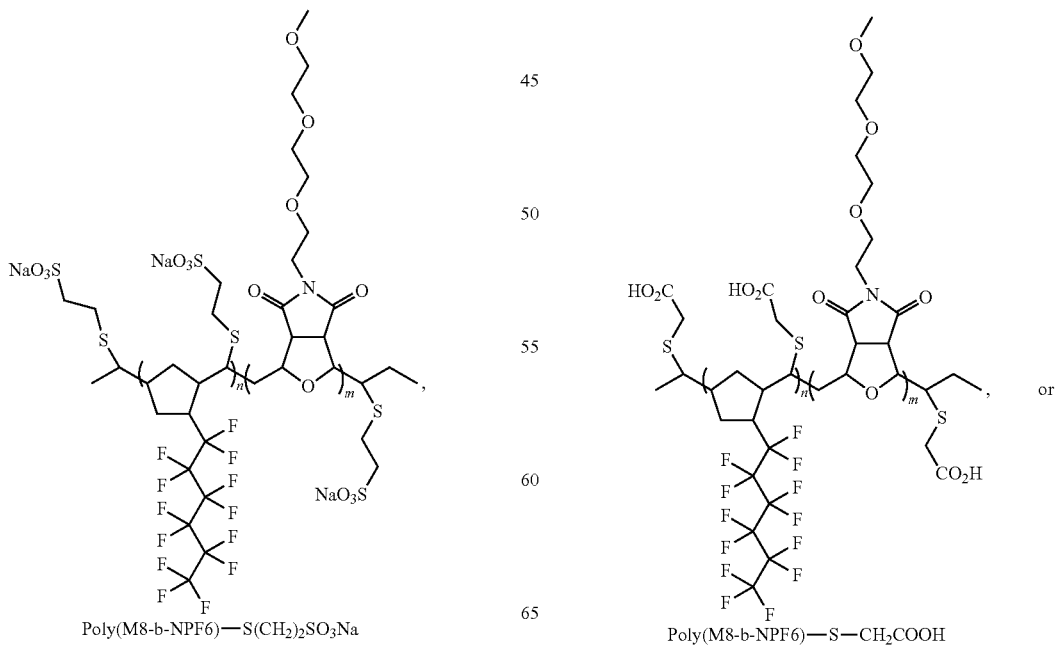

Poly(M8-b-NPF6)—S(CH₂)₂SO₃Na

Poly(M8-b-NPF6)—S—CH₂COOH

-continued

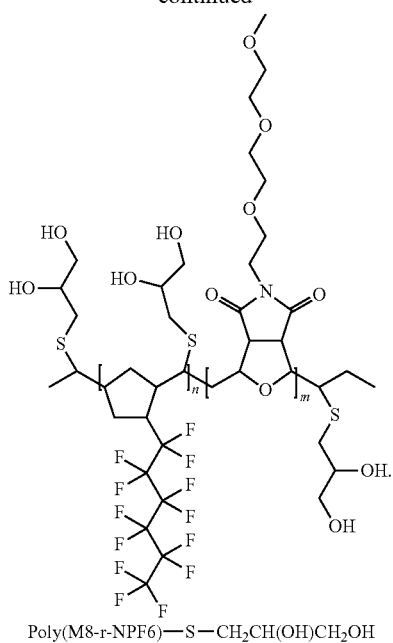

Poly(M8-r-NPF6)—S—CH₂CH(OH)CH₂OH

8. A method of hydrophilically modifying a porous fluoropolymer support comprising:

(i) providing a porous fluoropolymer support;

(ii) coating the porous fluoropolymer support with a solution comprising a solvent and a copolymer, wherein the copolymer comprises repeat units A and B, wherein A is of the formula:

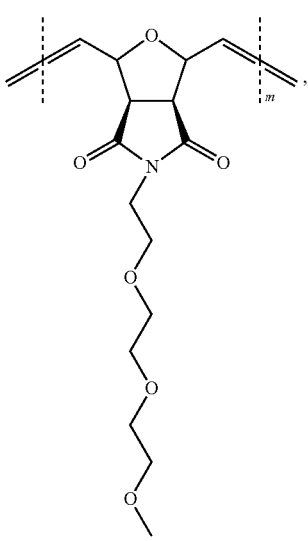

and B is of the formula

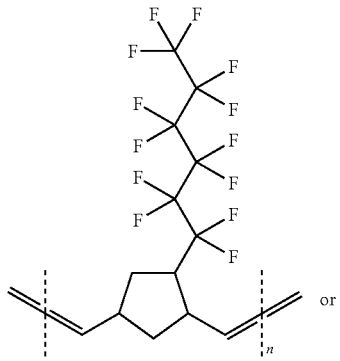

or

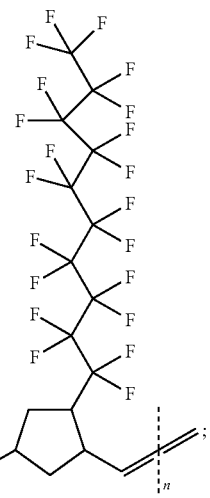

;

wherein:

the copolymer is a block copolymer or a random copolymer;

m and n, the number of repeat units A and B present in the copolymer, range from 1 to about 1000, provided the sum of n and m is equal to or greater than 10;

(iii) drying the coated fluoropolymer support from (ii) to remove at least some of the solvent from the solution comprising said copolymer; and optionally (iv) crosslinking said copolymer present in the coated porous fluoropolymer support.

9. The method of claim 8, wherein the solution further comprises, or the porous fluoropolymer support coated with the copolymer is further coated with, a polymer of the formula C:

(C)
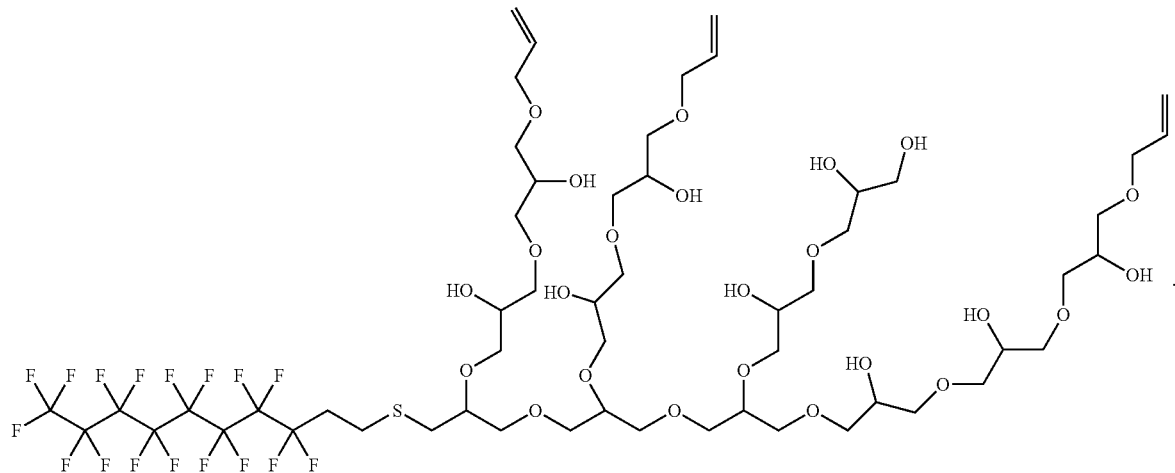
10. The method of claim 8, wherein the copolymer has chain end groups selected from aryl groups and alkoxy groups.
11. The method of claim 8, wherein the copolymer is:
-continued
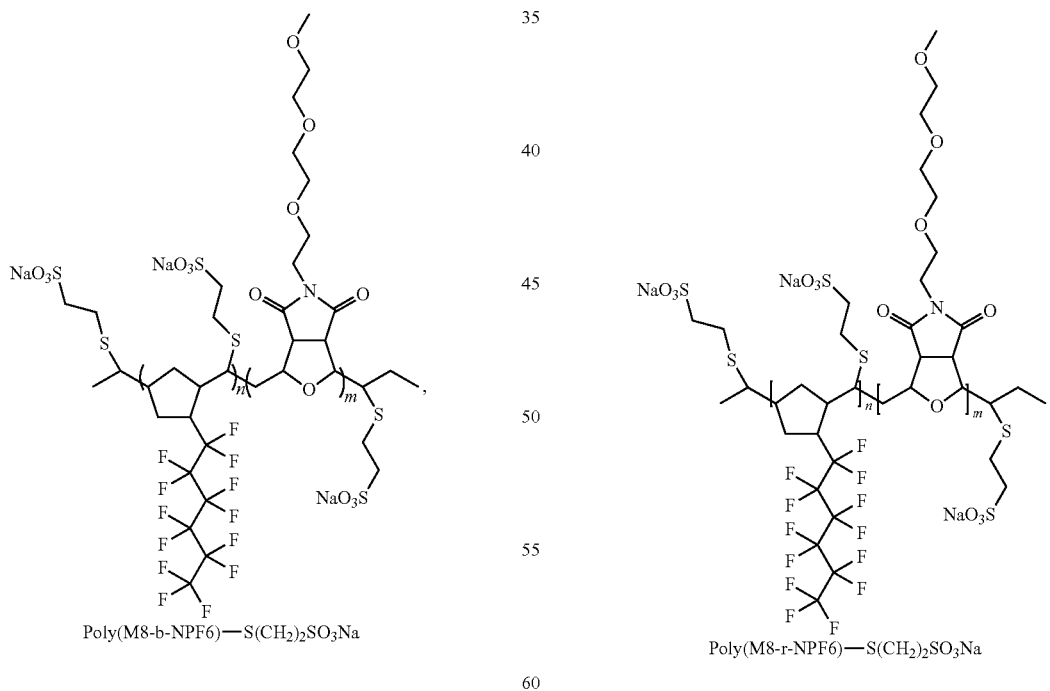
Poly(M8-b-NPF6)—S(CH$_2$)$_2$SO$_3$Na
Poly(M8-r-NPF6)—S(CH$_2$)$_2$SO$_3$Na -continued

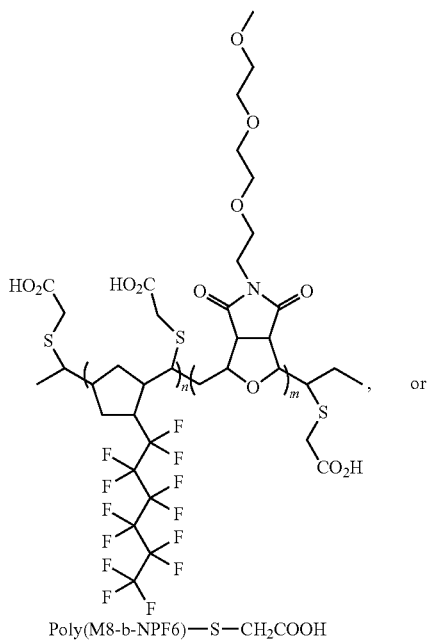

Poly(M8-b-NPF6)—S—CH₂COOH

, or

-continued

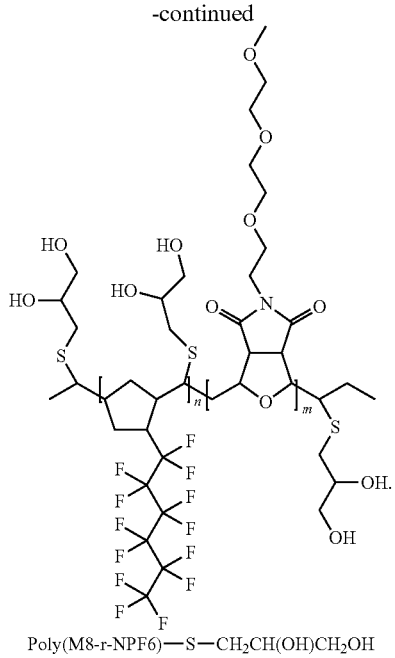

Poly(M8-r-NPF6)—S—CH₂CH(OH)CH₂OH

12. A hydrophilically modified porous fluoropolymer membrane produced by the method of claim 8.

13. The composite hydrophilic porous membrane of claim 1, wherein the porous fluoropolymer support is selected from PTFE, PVDF, PVF (polyvinyl fluoride), PCTFE (polychlorotrifluoroethylene), FEP (fluorinated ethylene-propylene), ETFE (polyethylenetetrafluoroethylene), ECTFE (poly ethylenechlorotrifluoroethylene), PFPE (perfluoropolyether), PFSA (perfluorosulfonic acid), and perfluoropolyoxetane.

14. A method of filtering a fluid, the method comprising passing the fluid through the composite hydrophilic porous membrane of claim 1.

15. The composite hydrophilic porous membrane of claim 1, which is configured in a planar, flat sheet, pleated, tubular, spiral, or hollow fiber configuration.

\* \* \* \* \*